United States Patent
Ho et al.

(10) Patent No.: US 8,457,026 B1
(45) Date of Patent: Jun. 4, 2013

(54) ENHANCED WIRELESS DATA RATES USING MULTIPLE BEAMS

(75) Inventors: Keang-Po Ricky Ho, San Jose, CA (US); Jianhan Liu, Sunnyvale, CA (US); Guocong Song, San Jose, CA (US); Karim Nassiri Toussi, Belmont, CA (US); Jeffrey M. Gilbert, Sunnvale, CA (US)

(73) Assignee: Sibeam, Inc., Sunnyvale, CA (US)

( * ) Notice: Subject to any disclaimer, the term of this patent is extended or adjusted under 35 U.S.C. 154(b) by 599 days.

(21) Appl. No.: 12/699,781

(22) Filed: Feb. 3, 2010

Related U.S. Application Data

(60) Provisional application No. 61/149,623, filed on Feb. 3, 2009, provisional application No. 61/149,625, filed on Feb. 3, 2009, provisional application No. 61/156,345, filed on Feb. 27, 2009, provisional application No. 61/165,375, filed on Mar. 31, 2009, provisional application No. 61/185,948, filed on Jun. 10, 2009, provisional application No. 61/233,939, filed on Aug. 14, 2009.

(51) Int. Cl.
*H04B 7/00* (2006.01)
*H01Q 3/00* (2006.01)

(52) U.S. Cl.
USPC ............................ 370/310; 370/334; 342/359

(58) Field of Classification Search
USPC ..................................... 370/310, 334; 342/359
See application file for complete search history.

(56) References Cited

U.S. PATENT DOCUMENTS

| | | | |
|---|---|---|---|
| 7,904,117 B2 * | 3/2011 | Doan et al. ................. | 455/562.1 |
| 2003/0020651 A1 * | 1/2003 | Crilly et al. ................... | 342/378 |
| 2008/0285667 A1 * | 11/2008 | Mondal et al. ............... | 375/260 |

* cited by examiner

*Primary Examiner* — Brian D Nguyen
(74) *Attorney, Agent, or Firm* — Blakely, Sokoloff, Taylor & Zafman LLP

(57) ABSTRACT

Enhanced wireless speeds are obtained using multiple transmission beams. In one example, a transmitter has a signal processor to receive a plurality of data streams, a plurality of analog converters each coupled to the signal processor to receive the plurality of data streams from the signal processor and to modulate the data streams onto carrier waves, and a plurality of phase shifters each coupled to an analog converter to each receive a modulated stream. A first antenna is coupled to more than one of the plurality of phase shifters to receive the modulated data stream from each phase shifter and transmit it on its respective carrier wave, and a second antenna is coupled to receive at least one modulated data stream and transmit it on its respective carrier wave.

20 Claims, 15 Drawing Sheets

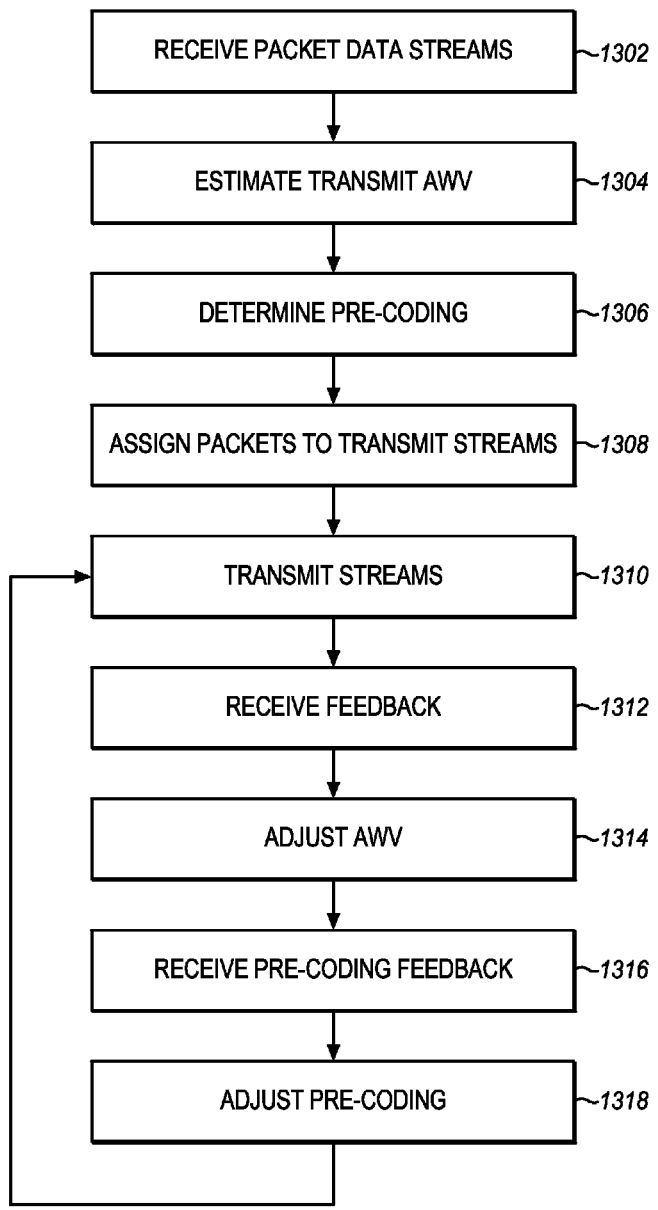

ENHANCED WIRELESS DATA RATES USING MULTIPLE BEAMS

RELATED APPLICATIONS

This application claims the benefit of the following U.S. Provisional Patent Applications:

Ser. No. 61/149,623, filed Feb. 3, 2009, entitled, DYNAMIC LINK ADAPTATION FOR WIRELESS VIDEO SYSTEMS WITH MULTIPLE ANTENNAS Ser. No. 61/149,625, filed Feb. 3, 2009, entitled POTENTIAL PHY IMPROVEMENTS FOR NEXT GENERATION WIRELESSHD Ser. No. 61/156,345, filed Feb. 27, 2009, entitled, PHY IMPROVEMENTS FOR WIRELESSHD V1.1

Ser. No. 61/165,375, filed Mar. 31, 2009, entitled, HIGH SPEED PHY MODES USING SPATIAL MULTIPLEXING (MIMO) FOR WIRELESSHD 1.1

Ser. No. 61/185,948, filed Jun. 10, 2009, entitled High-Speed PHY Modes Using Spatial Multiplexing (MIMO) for WirelessHD 1.1

Ser. No. 61/233,939, filed Aug. 14, 2009, entitled High-Speed PHY Modes Using Spatial Multiplexing (MIMO) for WirelessHD 1.1 which are incorporated herein by reference.

FIELD OF THE INVENTION

The present invention relates to the field of wireless communication; more particularly, the present invention relates to a wireless communication device that uses multiple streams to achieve increased transmission rates.

BACKGROUND OF THE INVENTION

WirelessHD is a wireless video area network (WVAN) specification that provides an interface for wireless high-definition (HD) transmission of video, audio, and data signals over short distances for consumer and commercial electronics products. In a primary application WirelessHD replaces a wired connection, such as an HDMI (High Definition Multimedia Interface) connection between a source, such as s set-top box, disk player, internet appliance, or camera, and a sink, such as a display or a recorder. WirelessHD is available to allow a wall mounted display to receive audio and video from a nearby set of components without any wires. Uncompressed 1080p resolution video with 24 bit color at 60 Hz refresh rates with uncompressed 8 channel audio is supported by WirelessHD for this purpose. Lower resolutions and video and audio only are also supported. However, the high data rates offered by WirelessHD can be used for other wireless networking applications.

WirelessHD allows for beam steering so that the energy of a data stream from a source can be focused on the sink receiver. This also allows for a beam to be steered around obstacles using reflections off walls and other fixtures. Accordingly, a direct line of sight (LOS) connection may be formed or a non-line of sight (NLOS) connection depending on the operating environment. The directional connection can be adapted during transmission through signaling and feedback protocols to meet different environments and changes in those environments. This allows for slow mobility devices to also be used in a WVAN.

The interface has a high rate physical channel (HRP) to carry the primary data traffic for audio visual and high rate devices. Current rates are on the order of a few Gb/s. This channel is typically directional and one-way. The HRP can support different data rates depending on the video or audio resolution being transmitted and also carries some control signaling. The WirelessHD interface also includes a low rate physical channel (LRP) also capable of supporting multiple data rates. The LRP is a two way signal that can be sent omni-directionally and operates on the same or overlapping carriers with the HRP. The LRP carries signaling and control signals as well as low rate data traffic. It has a range of a few Mb/s to 30 or 40 Mb/s. The LRP offers lower power and a more robust radio channel.

The WirelessHD air interface uses OFDM (Orthogonal Frequency Division Multiplexing) with different modulations. The data is encoded and may also be punctured before it is modulated. The unlicensed spectrum around 60 GHz can be used for wireless video transmission or very high-speed networking. More specifically, seven GHz of contiguous bandwidth has been opened for unlicensed use at millimeter-wave frequencies around 60 GHz in the U.S. and Japan The capability for high date rates and rich control signaling offered by WirelessHD provide great promise for many wireless networking applications. The value of the technologies available in WirelessHD can be increased further by supporting additional streams of HRP and LRP channels to multiple users simultaneously. With careful attention to channel quality, the bandwidth possible for one or more users can be increased well beyond 3 Gb/s. This can allow these technologies to go beyond WirelessHD to many other applications.

SUMMARY OF THE INVENTION

Enhanced wireless speeds are obtained using multiple transmission beams. In one example, a transmitter has a signal processor to receive a plurality of data streams, a plurality of analog converters each coupled to the signal processor to receive the plurality of data streams from the signal processor and to modulate the data streams onto carrier waves, and a plurality of phase shifters each coupled to an analog converter to each receive a modulated stream. A first antenna is coupled to more than one of the plurality of phase shifters to receive the modulated data stream from each phase shifter and transmit it on its respective carrier wave, and a second antenna is coupled to receive at least one modulated data stream and transmit it on its respective carrier wave.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 13A is a process flow diagram of transmitting from a source station to a sink station.

DETAILED DESCRIPTION OF THE PRESENT INVENTION

Figure 1:
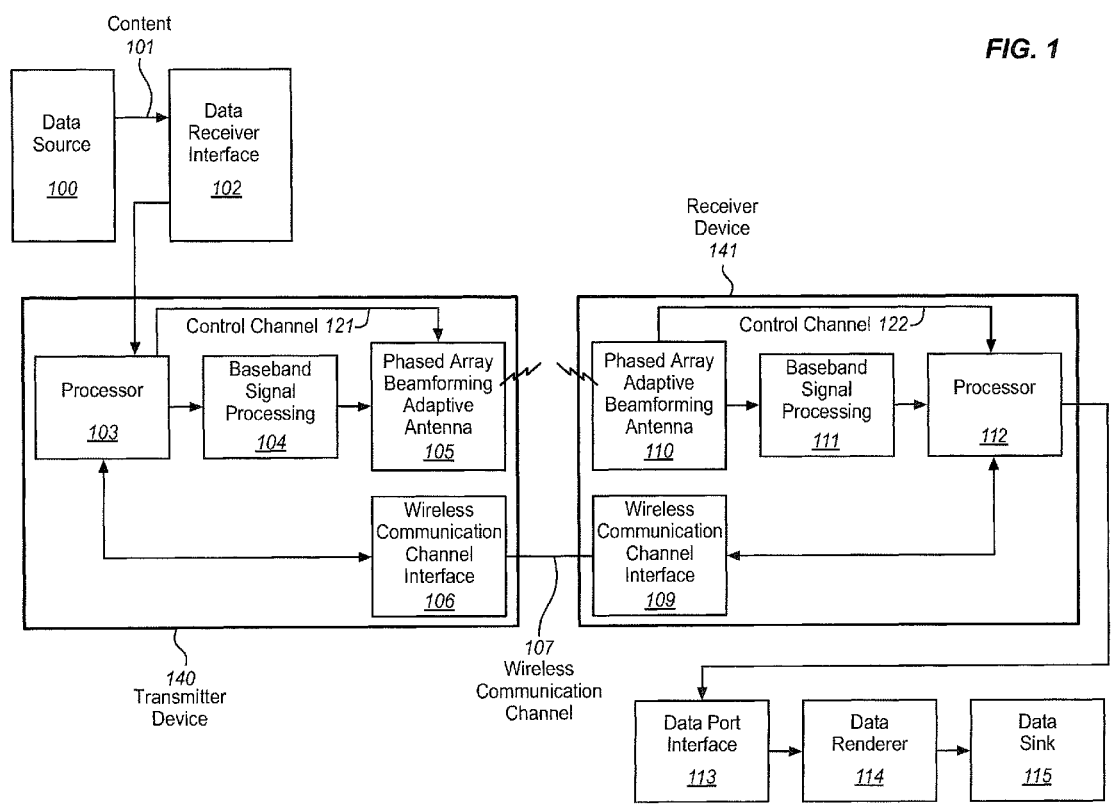
FIG. 1 is a block diagram of one embodiment of a communication system.

An apparatus and method for wireless communication is disclosed. In one embodiment, the wireless communication occurs using a wireless transceiver with an adaptive beam-forming antenna. As would be apparent to one skilled in the art, the wireless communication could occur with a wireless receiver or transmitter.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

AN EXAMPLE OF A COMMUNICATION SYSTEM

FIG. 1 is a block diagram of one embodiment of a communication system. Referring to FIG. 1, the system comprises data source, such as media receiver or data store 100, a data receiver interface 102, a transmitting device 140, a receiving device 141, a data port interface 113, a data renderer, such as a media player 114 and a data sink, such as a display 115.

Data source 100 receives content from a source (not shown) or generated content. In one embodiment, media receiver 100 comprises a set top box. The content may comprise baseband digital video, such as, for example, but not limited to, content adhering to the HDMI or DVI standards. Alternatively, the content may comprise any other type of data. In such a case, media receiver 100 may include a transmitter (e.g., an HDMI transmitter) to forward the received content.

Data source 100 sends content 101 to transmitter device 140 via data receiver interface 102. In one embodiment, data receiver interface 102 includes logic that converts content 101 into HDMI content. In such a case, data receiver interface 102 may comprise an HDMI plug and content 101 is sent via a wired connection; however, the transfer could occur through a wireless connection. In another embodiment, content 101 comprises DVI content.

In one embodiment, the transfer of content 101 between data receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beam-forming. The other wireless connection is via wireless communications channel 107, referred to herein as the back channel. In one embodiment, wireless communications channel 107 is uni-directional. In an alternative embodiment, wireless communications channel 107 is bi-directional.

Receiver device 141 transfers the content received from transmitter device 140 to data renderer 114 via data port interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Data renderer 114 causes the content to be played on display 115. In one embodiment, the content is HDMI content and media player 114 transfers the media content to display 115 via a wired connection; however, the transfer could occur through a wireless connection. Display 115 may comprise a plasma display, an LCD, a CRT, etc.

Note that the system in FIG. 1 may be altered to include any other video or audio generator/player/recorder in place of a DVD player/recorder to receive, and play and/or record the content.

In one embodiment, transmitter 140 and data receiver interface 102 are part of data source 100. Similarly, in one embodiment, receiver device 141, data port interface 113, and data renderer 114 are all part of the same device. In an alternative embodiment, receiver device 141, media player interface 113, media player 114, and display 115 are all part of the display.

In one embodiment, transmitter device 140 comprises a processor 103, a baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beam-forming.

In one embodiment, receiver device 141 comprises a processor 112, a baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beam-forming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals. In one embodiment, transmitter device 140 and/or receiver device 141 are part of separate transceivers.

Transmitter device 140 and receiver device 141 perform wireless communication using phased array antenna with adaptive beam-forming that allows beam steering. Beam forming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

AN EXAMPLE OF TRANSCEIVER ARCHITECTURE

Figure 2:
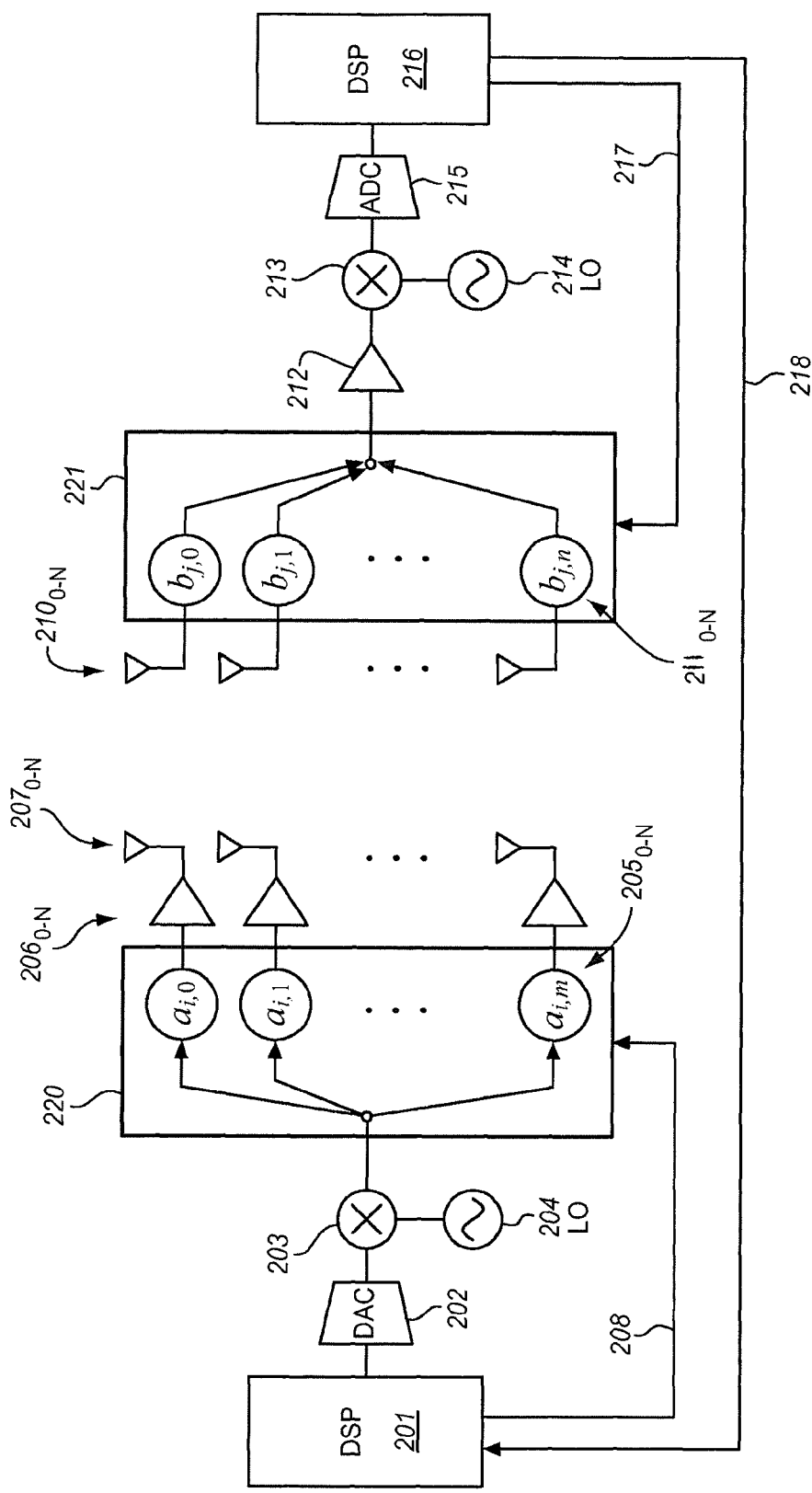
FIG. 2 is a more detailed block diagram of one embodiment of the communication system.

FIG. 2 is a block diagram of one embodiment of an adaptive beam forming multiple antenna radio system contained in transmitter device 140 and receiver device 141 of FIG. 1.

Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control. DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0-256 MHz signals. In an alternative embodiment, the signals output from DAC 202 are between 0-750 MHz signals.

Mixer 203 receives signals output from DAC 202 and combines them with a signal from a local oscillator (LO) 204. The signals output from mixer 203 are at an intermediate frequency. In one embodiment, the intermediate frequency is between 2-15 GHz.

Multiple phase shifters $205_{0-N}$ receive the output from mixer 203. A demultiplexer is included to control which phase shifters receive the signals. In one embodiment, these phase shifters are quantized phase shifters. In an alternative embodiment, the phase shifters may be replaced by complex multipliers, which control both phase and magnitude. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_0$-N receive the wireless transmissions from antennas $207_{0-N}$ and provide them to phase shifters $211_{0-N}$. As discussed above, in one embodiment, phase shifters $211_{0-N}$ comprise quantized phase shifters. Alternatively, phase shifters $211_{0-N}$ may be replaced by complex multipliers. Phase shifters $211_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of 0 to about 250 MHz. In one embodiment, there are I and Q signals for each channel. In an alternative embodiment, the output of mixer 213 is a signal in the range of 0 to about 750 MHz.

Analog-to-digital converter (ADC) 215 receives the output of mixer 213 and converts it to digital form. The digital output from ADC 215 is received by DSP 216. DSP 216 restores the amplitude and phase of the signal. DSPs 211 may provide demodulation, packet disassembly, de-interleaving, FEC decoding, and automatic gain control.

In one embodiment, each of the transceivers includes a controlling microprocessor that sets up control information for DSP. The controlling microprocessor may be on the same die as the DSP.

Adaptive Beam Forming

In one embodiment, the baseband processing implements an adaptive algorithm with the beam forming weights being implemented in hardware. That is, the transmitter and receiver work together to perform the beam forming in RF frequency using digitally controlled analog phase shifters; however, in an alternative embodiment, the beam-forming is performed in IF or even at baseband. Phase shifters $205_{0-N}$ and $211_{0-N}$ are controlled via control channel 208 and control channel 217, respectfully, via their respective DSPs in a manner well known in the art. For example, DSP 201 controls phase shifters $105_{0-N}$ to have the transmitter perform adaptive beam-forming to steer the beam while DSP 211 controls phase shifters $211_{0-N}$ to direct antenna elements to receive the wireless transmission from antenna elements and combine the signals from different elements to form a single line feed output. In one embodiment, a multiplexer is used to combine the signals from the different elements and output the single feed line. While DSP controlled beam forming is shown, dedicated logic may be used instead. An embedded processing unit or any other system may be used to control the beam forming.

DSP 201 performs the beam steering by configuring the appropriate phase shifter connected to each antenna element. The configuration algorithm under DSP 201 controls the phase and gain of each element. Performing DSP controlled phase array beam-forming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

Assuming DSP 101 is in a stable state and the direction the antenna should point is already determined. In the nominal state, the DSP will have a set of coefficients that it sends to the phase shifters. The coefficients indicate the amount of phase the phase shifter is to shift the signal for its corresponding antennas. For example, DSP 101 sends a set of digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 34, 32, 64 elements in the array by different amounts enables the antenna to be steered in a direction that provides the most sensitive reception location for the receiving antenna. That is, the composite set of shifts over the entire antenna array provides the ability to steer where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel, or link, for transmitting information between wireless communication devices (e.g., a transmitter and receiver, a pair of transceivers, etc.). The information is related to the beam-forming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 2, back channel 218 is coupled between DSP 216 and DSP 201 to enable DSP 216 to send tracking and control information to DSP 201. In one embodiment, back channel 218 functions as a high speed link and an acknowledgement channel.

During the active period when the beam-forming antennas are transferring content, the back channel is used to allow the receiver to notify the transmitter about the status of the channel. For example, while the channel between the beam-forming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beam-forming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, continuous-phase modulation (CPM) with low peak-to-average power ratio is used to transfer information over the back channel.

Physical Layer (PHY) Overview

The WirelessHD specification supports two basic types of PHY: high rate PHY (HRP) and low rate PHY (LRP). In accordance with one embodiment, HRP supports multi-Gbps data rates. HRP may operate in a directional mode (typically beam-formed mode). HRP may be used to transmit audio, video, data, and control messages. LRP can only be sent from HTx/HTR devices to HRx/HTR devices. In one embodiment, HRP occupies roughly 1.7 GHz bandwidth.

In accordance with one embodiment, LRP supports multi-Mbps data rates. LRP may operate in a directional, omni-directional, or beam-formed modes. In one embodiment, LRP may be used to transmit control messages, beacons, and acknowledgements. In an alternative embodiment, LRP may further be used to transmit audio or compressed video. In yet another embodiment, LRP may further be used to transmit low-speed data. LRP can be sent between any devices. LRP occupies one of three 91 MHz sub-channels within HRP channel as discussed below.

Frequency Planning

Figure 3:
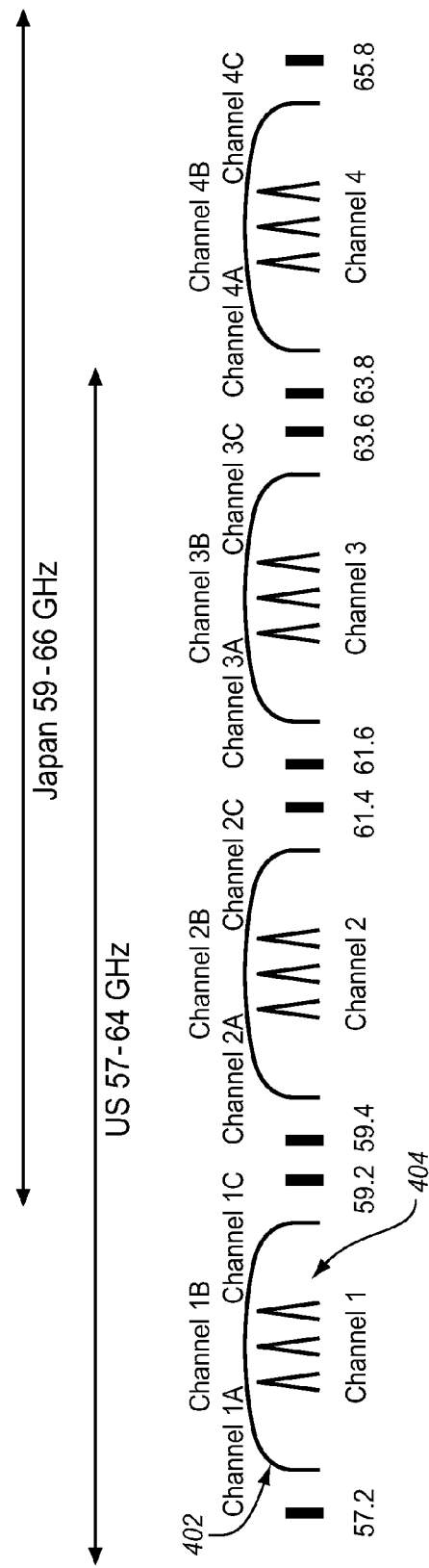
FIG. 3 is a block diagram of one embodiment of different channels sharing frequencies.

HRP and LRP may share the same frequency band. FIG. 3 illustrates one embodiment of frequency planning for HRP and LRP. The low-rate channels 304 share the same frequency band as the corresponding high-rate channels 302. Three low-rate channels 1A, 1B, 1C may be allocated within each high-rate channel bandwidth (channel 1) to avoid interference. In accordance with another embodiment, the low-rate and high-rate channels may operate in time-division duplex mode. FIG. 3 illustrates an example of four channels between 57 GHz to 66 GHz: channel 1 operating between 57.2 GHz and 59.2 GHz, channel 2 operating between 59.4 GHz and 61.4 GHz, channel 3 operating between 61.6 GHz and 63.6 GHz, channel 4 operating between 63.8 GHz and 65.8 GHz.

High-Rate PHY (HRP)

HRP may support data rates of 3.76 Gbps, 1.88 Gbps, and 0.94 Gbps or any other desired rates. The data rates may individually correspond to a video resolution standard of 1080p, 1080i, 480p for various sampling rates depending on needs. As a result, the range may be increased at lower data rates. Higher PHY rates may still allow for multiple lower-rate streams via MAC.

HRP may utilize several types of coding and modulation: OFDM, 16QAM and QPSK modulations, inner convolutional code (rate of $1/3$, $2/3$, $4/7$, $4/5$), and outer Reed-Solomon rate 0.96 code. The use of Reed-Solomon outer code in addition to the inner convolution code reduces SNR requirements by about 2 dB. An outer interleaver may be used to realize full gains of the outer code.

Figure 4:
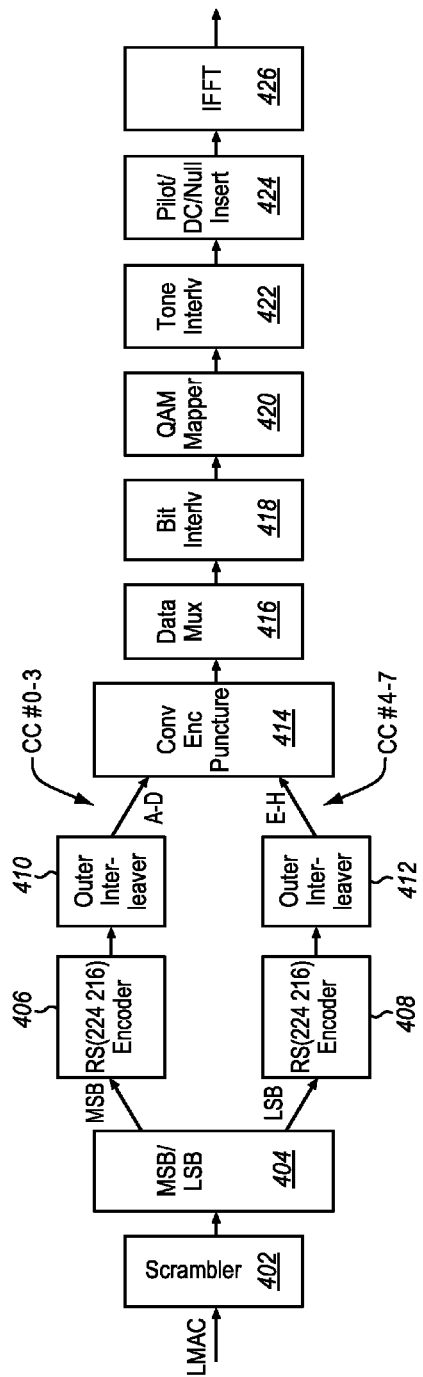
FIG. 4 is a block diagram of one embodiment of a physical layer for the WirelessHD communication system of FIG. 1.

FIG. 4 illustrates one embodiment of a Tx PHY block diagram. A scrambler 402 receives LMAC (Lower Media Access Control) data and feeds into MSB/LSB (Most Significant Bit/Least Significant Bit) separation block 404. For MSB, RS (Reed-Solomon) encoder 406 and outer interleaver 410 may be used. For LSB, RS encoder 408 and outer interleaver 412 may be used. A puncture circuit 414 may be coupled to outer interleavers 410 and 412. The following circuits form the sequence following the puncture circuit 414: data mux 416, bit interleaver 418, QAM (Quadrature Amplitude Modulation) mapper 420, tone interleaver 422, pilot/DC/null insert 424, and IFFT (Inverse Fast Fourier Transform) 426.

Low-Rate PHY (LRP)

LRP may be used for MAC frame transmission (e.g., ACKs, beacons, discovery, etc. . . . ), for low rate (less than 40 Mbps) streaming from A/V source, for transmission of data used for antenna steering and tracking. LRP may be designed with OFDM based on 128-point FFT with BPSK modulation, and convolutional coding at $1/3$, $1/2$, and $2/3$ rate. No Reed-Solomon code may be required due to messages being shorter and a higher BER tolerance. LRP may operate in three modes: LRP Omni-directional (long) mode, LRP Beam-formed mode, and LRP Directional (short) mode.

LRP Tx processing, may include scrambling, applying forward error correction or similar codes, interleaving, mapping bits to symbols, performing an IFFT, applying a cyclic prefix, symbol shaping and upconversion to an intermediate or carrier frequency. Any one or more operations may be modified or deleted.

Multiple Stream Transceiver Architectures

Figure 5:
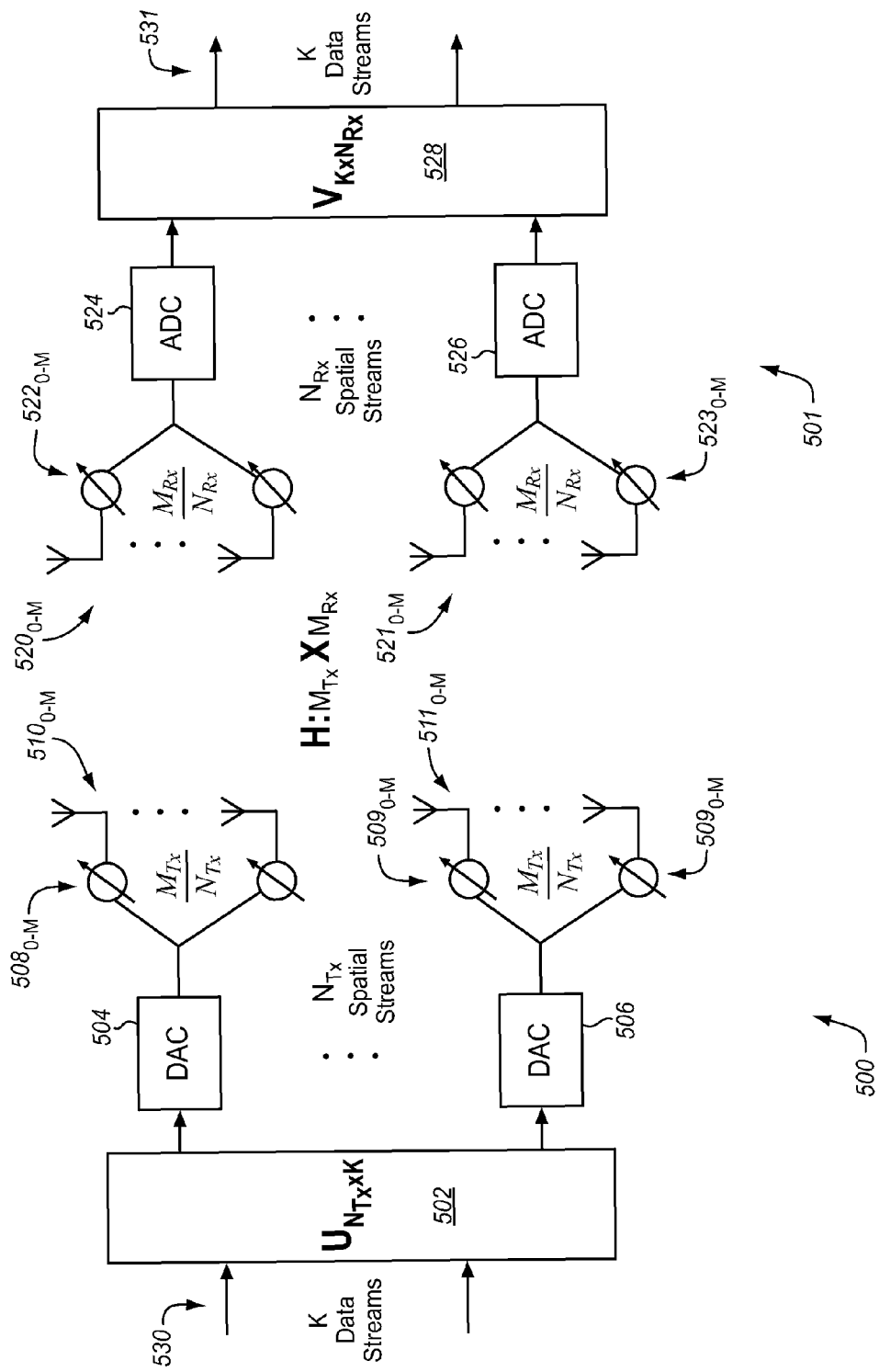
FIG. 5 is a block diagram of another embodiment of a communications system.

FIG. 5 shows an example of a transceiver architecture for sending multiple streams. It contains a transmitter device 500 and a receiver device 501. Transmitter 500 contains multiple independent transmit chains and receiver 501 contains multiple independent receive chains. Transmitter 500 transmits multiple independently steered beams through multiple phased antenna arrays 508, 509, 510, 511. FIG. 5 shows an architecture similar to that of FIG. 2, however, many of the details, such as modulators, amplifiers, mixers, multiplexers, etc. of FIG. 2 are removed in order to simplify the drawing.

In FIG. 5, multiple data streams, in this case K streams, are received at a processor 502. In one embodiment, the streams are in the form of data packets that can represent video, audio, or other data. Each stream can correspond to the same video for transmission to the same station or to any desired packets from the same or different videos or other data between the two stations. The processor distributes the streams to digital to analog converters (DACs) 504, 506. In one embodiment, each DAC receives data that is to be sent as a single beam. The analog signals are modulated onto carrier waves and sent to each of M phase shifters 508, 509 for the N_Tx (transmit) beams. The M phase shifters are coupled to M antenna elements 510, 511 to send the N_Tx steered beams. Because the DACs, phase shifters and antenna elements are independent, the beams can be steered in different directions, or in the same direction.

In FIG. 5, there are K data streams and N_Tx transmit spatial streams. Each transmit spatial stream is sent to its own DAC. K and N_Tx may be the same number or different numbers. Each spatial stream is transmitted by a subset of the M_Tx antenna elements coupled to M_Tx phase shifters to steer the beam formed by each antenna array. The number of antenna elements M_Tx is not necessarily related to K and N, but determines the accuracy and complexity of the beam steering algorithms. The amount of available spectrum in the unlicensed 60 GHz band varies depending upon local laws. The unlicensed 60 GHz band in many locations can accommodate three different transmit streams without frequency overlap, however, by steering the transmit beams to different stations in different locations, more than three spatial streams can be transmitted. While the description is presented in the context of the unlicensed 60 GHz band, the invention is not so limited.

Similarly, receiver, 501 receives the N_Rx spatial streams each through its own receive chains. Each receive chain has an antenna array 520, 521 of a portion or a subset of the M_Rx elements each coupled to a phase shifter 522, 523. Each antenna receive chain is coupled to an analog to digital converter 524, 526 to reduce the combined received signal to baseband. The baseband signal is provided to a processor 528 to produce K data streams 531. K data streams 531 match the K data streams 530 received in transmit processor 502. Alternatively, receiver 501 can receive all N_Tx spatial streams in less than N_Tx receive antenna arrays. Even a single chain receive chain may be used. In both receiver 501 and transmitter 500, only two converters 504, 506, 524, 526 and two antenna arrays 510, 511, 521, 521 are shown, however there may be many more as indicated by number N.

In one embodiment, the antennas associated with the N_Tx transmit chains have different polarizations. Two different transmit chains can carry two independent data streams along the same or similar paths using the same or similar frequencies and phase shifting coefficients by using two or more different polarizations, such as horizontal and vertical or right circular and left circular polarizations. Signal isolation is enhanced by using only orthogonal polarization, however, interference between the two signals can also be isolated using encoding and error correction techniques mentioned above, among others.

In FIG. 5, different polarization states can be achieved by configuring the different groups or subsets of the M_Tx antenna elements 508, 509 to transmit with a particular polarization state and orientation. For example the first array 508 can have horizontally polarized antenna elements and the second array 509 can have vertically polarized antenna elements. The K data streams can be split so that one stream is sent to one transmit chain and the other stream is sent to the other transmit chain. In addition, additional transmit streams can be used to send spatial streams to the same station with the same polarization on a different frequency band. Alternatively, different phase shifter settings can be used to keep spatial streams distinct. The use of phase shifter settings and the choice of particular antenna arrays can be controlled by the baseband signal processing.

Similarly in the receiver, receive streams can be combined using multiple combiners, one for each polarization state or for other groupings. A single combiner can be configured to receive inputs from antennas of a given polarization in order to reduce the total number of inputs to each combiner and the number of connections to each input stream. In a more complex alternative, the connections between antennas and combiners can be flexible to allow receiver 501 to be reconfigured depending upon the configuration of the transmitted spatial streams.

Figure 6:
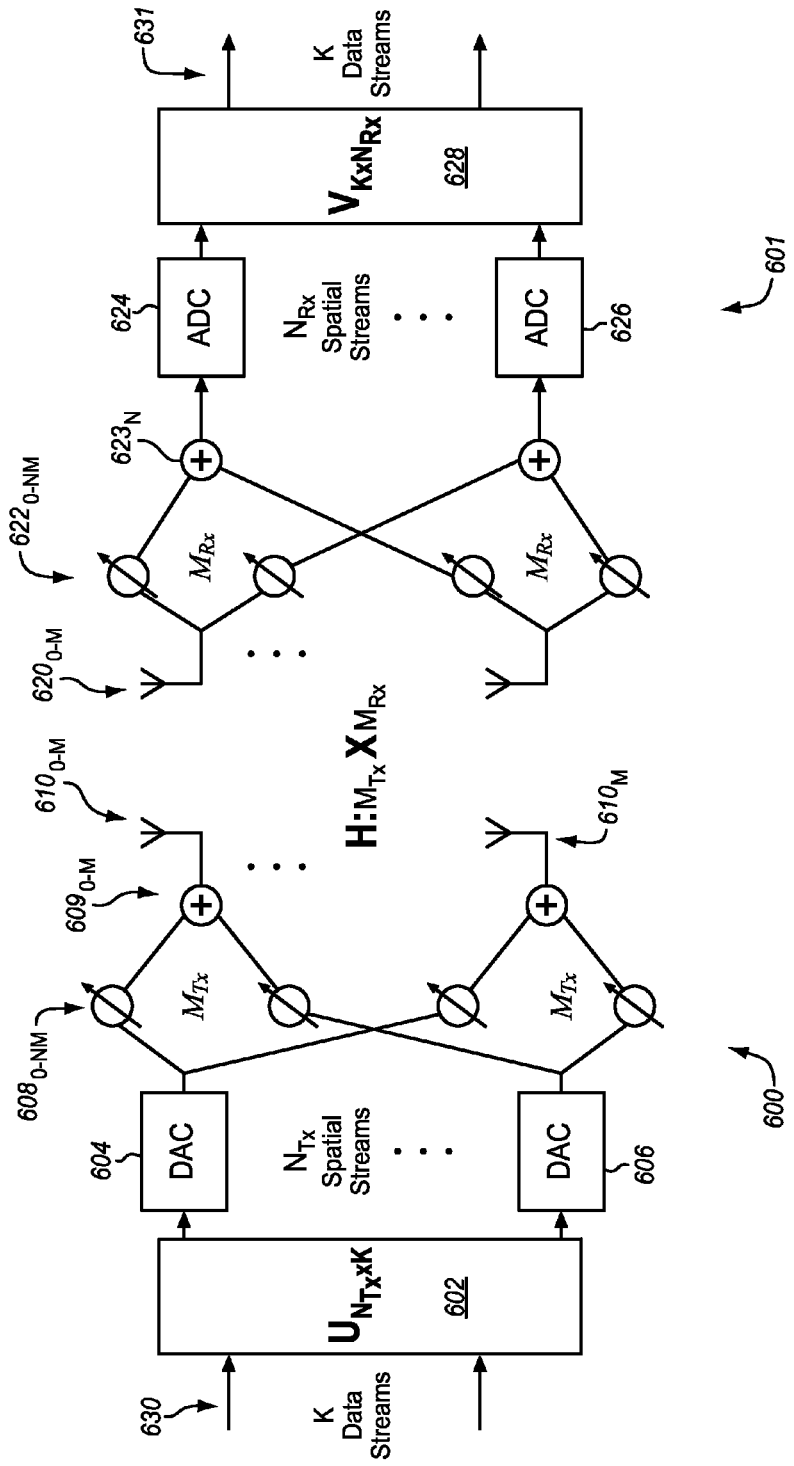
FIG. 6 is a block diagram of another embodiment of a communications system.

FIG. 6 shows an alternative transmitter and receiver architecture. It shows a transmitter device 600 and a receiver device 601. Transmitter 600 contains multiple independent transmit chains and receiver 601 contains multiple independent receive chains. Transmitter 600 transmits multiple independently steered beams through a single phased antenna array 610 with M antenna elements. As with FIG. 5, many of the details are removed in order to simplify the drawing.

In FIG. 6, multiple data streams, in this case K streams 630, are received at a baseband processor 602. The processor distributes the streams to digital to analog converters (DACs) 604, 606. In one embodiment, each DAC receives data that is to be sent as a single beam. The analog signals are modulated onto carrier waves and sent to each of NM phase shifters 608 for the N beams. The NM phase shifters are coupled to M_Tx antenna elements 610 to send the N_Tx steered beams. Because the DACs and phase shifters are independent, the beams can be steered in different directions, or in the same direction.

In FIG. 6, there are K data streams, N transmit spatial streams and M antenna elements in the array. Each transmit spatial stream is sent to its own DAC. As in FIG. 5, the number of antenna elements M is not necessarily related to K and N, but determines the accuracy and complexity of the beam steering algorithms.

In FIG. 6, each DAC 604, 606 is coupled to some or all of the antenna elements through a phase shifter 608. For the N_Tx DACs and M_Tx antenna elements there are, accordingly, N_Tx*M_Tx phase shifters, with N_Tx phase shifters coupled through a combiner to each antenna element. For example with 3 spatial streams and 36 antenna elements, there are 108 phase shifters, 3 for each of the 36 elements. This allows each stream to be coupled into each antenna element through its own phase shifter. As a result, each spatial stream can be independently steered by its own set of phase shifters. The streams from each phase shifter are combined for each antenna element in a mixer 609. In one embodiment, each antenna element 610 has a mixer 609 from which it receives its components of all of the streams that it will transmit. The antenna array in transmitter 600 can transmit all N_Tx spatial streams simultaneously with independent beam steering.

Similarly, receiver, 601 receives the N_Rx spatial streams each through its own receive chain. Each receive chain shares the single antenna array 620 of M_Rx elements each coupled to M_Rx (receive) phase shifters 622. The phase shifters are coupled in N_Rx groups to each of the N_Rx analog to digital converters 624, 626 to reduce the combined received signals to baseband. The baseband signals are provided to a processor 628, such as a DSP to produce K data streams 631. K data streams 631 match the K data streams 630 received in transmit processor 602. In both receiver 601 and transmitter 600, only two converters, two streams and one antenna array are shown, however there may be many more as indicated by N_Tx and N_Rx.

Transmit antenna array 609 can be wholly or partially duplicated as with array 510 of FIG. 5 to support different polarization orientations. Multiple transmit chains can carry independent data streams using the same or similar frequencies and phase shifting coefficients by using two or more different polarizations, as described above. Receiver 601 can be similarly modified.

Figure 7:
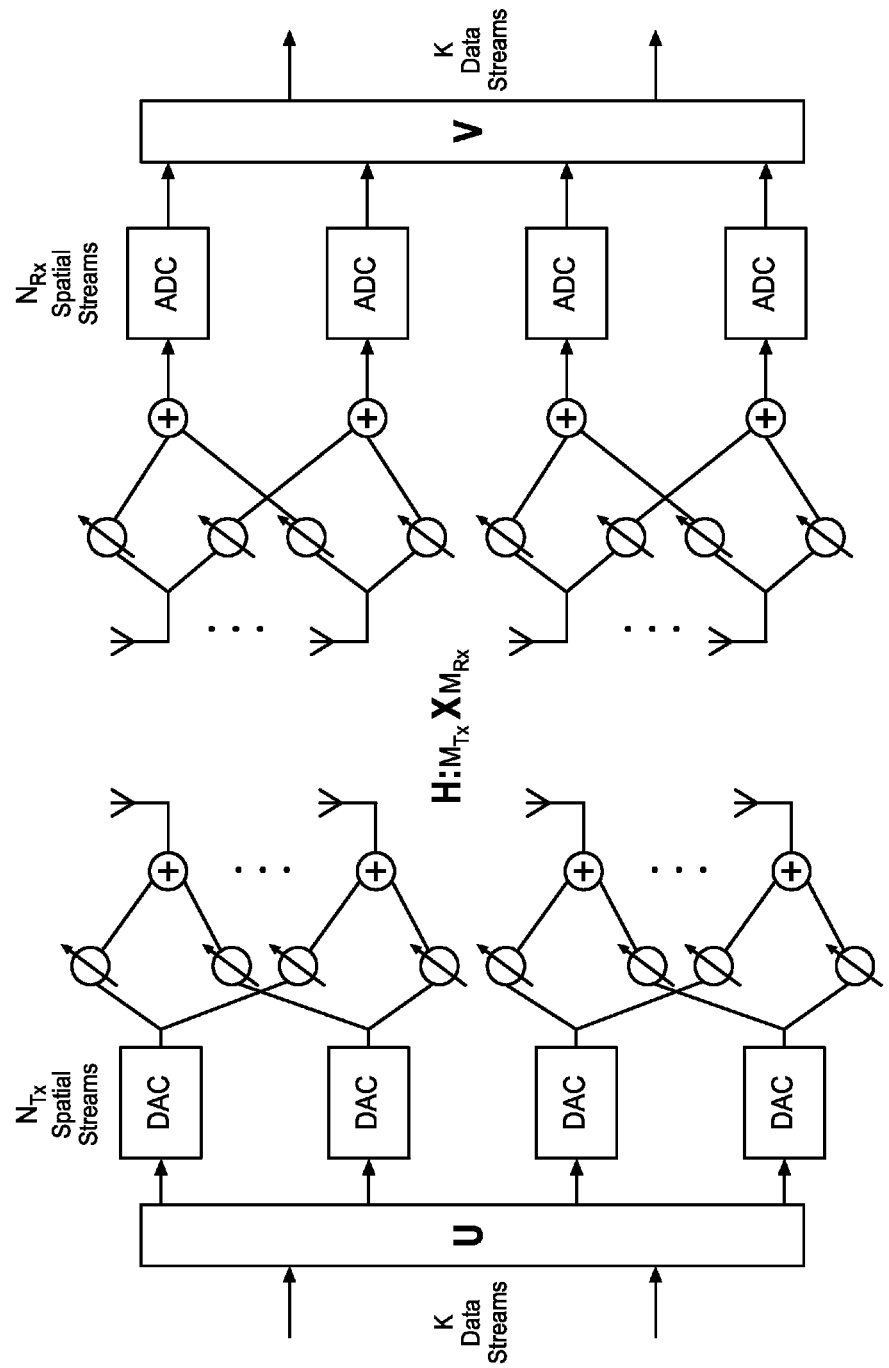
FIG. 7 is a block diagram of another embodiment of a communications system.

Such a modification is shown in FIG. 7. In FIG. 7, the architecture of FIG. 5 is repeated twice, although more repetitions may be used. This creates a hybrid of the FIGS. 5 and 6 designs. All of the DACs are connected to a single control matrix U, so that each transmit or receive chain can be controlled as a system. This hybrid configuration allows flexibility in how signals can be transmitted. The two repetitions can be used to each send a signal with a different polarization, different beam forming, different destinations or data sinks, or different data sources. As in FIGS. 5 and 6, while the receiver architecture is shown as being the reciprocal of the transmitter architecture, this is not necessary. The receiver can be much simpler or different from the transmitter, depending on the application.

In the example of FIG. 6, each of the input signals or streams can go to all of the antenna elements in an array or to just a subset of the elements of an array. For each signal there is a separate phase shifting element for each signal and for each antenna element. Conventional beam search and beam tracking processes can be applied to each stream independently.

For the receiver 501, 601, the hybrid combining architecture of FIG. 7 can be used instead of the architecture shown. Such architecture can independently receive each antenna beam and independently demodulate and convert it to baseband. Baseband processing can then perform the functions of the phase shifters, combiners, and their connections. In other words, baseband matrix operations can divide by a channel matrix to convert the M_Rx antenna streams into the N_Rx data streams. This allows for more flexibility but requires more complex baseband electronics. The transmitter can similarly be implemented using a baseband combining architecture. The physical hardware embodiments shown and described above are an example of how these functions and features can be implemented.

As a further alternative, all or some of the antenna elements can feed into a different number of combiners through intervening phase shifters. In one embodiment, there are fewer combiners than there are antenna elements, M, but the same number or more combiners than there are spatial streams, N. The combiner outputs are then demodulated and digitally converted to the same number of data streams, one for each combiner. This can be done in one or more stages, depending on the numbers of combiners and streams. The baseband processes allow the matrix elements to also be adjusted during beam steering, searching and training processes.

The shared antenna architecture of FIG. 5 provides an advantage of higher transmit power for each beam. This is in part because each stream is transmitted using the entire antenna array. In addition a formed beam is formed more accurately because it is formed by a larger number of antenna elements. These advantages can yield a higher signal to noise ratio which can allow for higher coding and modulation rates and higher data rates. On the other hand the shared architecture of FIG. 5 is more complex than the split architecture of FIG. 6. The split architecture allows each spatial stream to be handled more simply using completely independent hardware.

Beam-Forming Overview

In one embodiment, the communication system implements beam-forming with the following elements: a beam-search process; a beam-tracking process; and a beam-steering state machine. The beam search and beam tracking are used to compensate for the time-variation of the wireless channel and the possible obstruction of narrow beams. When called, the beam-search process finds the beam directions that maximize the link budget. The obtained beam directions are then used for beam-forming. After the beam-search process has resulted in optimal beam-forming, the beam-tracking process tracks the beam versus small time-variations in the channel transfer function. The beam-steering state machine uses any of a variety of different bad link detection mechanisms (which can based on payload or beam-tracking results) to detect whether signal quality is sufficient such as by comparing the Signal-to-Noise Ratio of the current link to a desired threshold. For purposes herein, a bad link means that current beam direction is impaired, perhaps by an obstruction, and subsequently a new beam-search is scheduled to find a new beam direction.

The beam steering process begins in an acquisition state. In one embodiment, the acquisition state is only entered once during link setup. After initial acquisition, a beam search is performed. The beam search can be performed as soon as a source (e.g., a transmitter) or destination (e.g., a receiver) determines that a channel is considered bad (e.g., beam obstructed) (based on one or more metrics). The beam search can also be scheduled regularly (e.g., every 0.5-2 sec) during data transfers. This may be useful in case of the beam being blocked. In one embodiment, beam tracking is performed during data transfer at predetermined intervals (e.g., every 1-2 msec). In one embodiment, the beam tracking is a shortened version of the beam search process. These may be scheduled or based on request.

In one embodiment, beam-forming at the transmitter is performed by rotating the phase of the RF-modulated signal individually for each RF power amplifier and transmit antenna set, where phase rotation is described by the following equation:

$$A(t)\cos(2\pi f_c t + \varphi(t)) \xrightarrow[\text{rotate by } \theta]{} A(t)\cos(2\pi f_c t + \varphi(t) + \theta)$$

and the rotation angle θ is quantized to 1-4 bits. This may be achieved using quantized phase shifters.

Similarly, in one embodiment, beam-forming at the receiver is performed by rotating the phase of the received RF-modulated signal after each receive antenna and Low-Noise Amplifier (LNA) set, and then combining the phase-rotated signals.

It should be noted that in one embodiment, the receive antennas are coupled to one or more digitization paths, and the number of digitization paths is less than the number of receive antennas. Also, in one embodiment, the transmit antennas are coupled to one or more transmit signal generation paths, and the number of transmit signal generation paths are less than the number of transmit antennas.

AN EXAMPLE OF A BEAM-SEARCH PROCESS

In one embodiment, the beam-search process consists of two stages: timing recovery and an iterative beam-search. In the timing recovery stage, arrival time (delay) of the beam/ray with maximum gain is estimated. In one embodiment, delay estimation is performed by transmitting a known symbol sequence over the air and matching that sequence at the receiver via a matched filter. To maximize the signal-to-noise ratio, transmit antenna phases are set equal to columns of the N×N Hadamard matrix, H, one column at a time, where H has the following properties:

$$H(i,j) \in \{-1,1\}, H^T H = NI_{N \times N}$$

where $H^T$ is the transpose of H, and $I_{N \times N}$ is the N×N identity matrix. Transmit antenna phases are swept through N columns of H (set equal to one at a time) P (e.g., 3) times, where each time a different receive antenna phase pattern is used. Receive antenna phase patterns are selected such that the corresponding beams cover the entire space. The receiver matched filter correlates the received signal, r (k), with the transmitted sequence, x(k), as described by the following equation, where the pattern is L symbol long:

$$y(k) = \sum_{i=0}^{L-1} r(k+i)x(i)$$

The time delay that results in a maximum matched-filter output energy, after it is summed over all transmit and receive antenna phase patterns, is selected as the time-delay of the maximum gain beam/ray. In addition, the receive antenna phase pattern, for which the matched-filter output at the selected time-delay has maximum energy, after it is summed over all transmit antenna phase patterns, is also selected.

At the next stage, a beam-search iterative process is used that, in one embodiment, alternatively changes transmit and receive phase patterns for a total of 2M (even) number (e.g., 4, 6, 8 or 10) of stages. In another embodiment, 2M+1 stages can be used to have an extra Rx or Tx stage. In almost all cases, transmit and receive phase patterns converge towards the optimum values corresponding to the maximum-gain beam direction. In some isolated cases, the transmit and receive phase patterns may fluctuate between different phase patterns that correspond to similar beam-forming gains.

For the first iteration, the receive phase pattern is set to one of the P phase patterns that was selected at the end of the last timing-recovery stage. In other words, the receiver phase shifts are set to an i-th initial value (for i=1, 2, 3, etc.). In one embodiment, the receive phase shifts are set by setting values of an antenna-array weight vector (AWV). The transmit pattern, on the other hand, is set equal to N columns of the Hadamard Matrix H one at a time. In one embodiment, a 36×36 Hadamard matrix is used. Note that for a certain number of antennas, another unitary matrix could be used. Also, note that in one embodiment, the antenna-array weight vectors (AWV) for the receiver and the transmitter are complex weight vectors that can have magnitude and/or phase information. In one embodiment, the weight vectors are quantized phase shift vectors.

The transmitter transmits a known symbol sequence over the air, which is used to estimate resulting Single-Input Single-Output (SISO) channel transfer functions from the RF-modulated signal before N transmit antenna phase rotations to the combined signal after N receive antenna phase rotations. During this stage, the transmitter phased array antenna switches between phase vectors derived from columns of matrix H, which span the entire space. In one embodiment, the transmitter antenna array weight vector (AWV) includes 36 weight vectors. For each transmit phase pattern, the received signal is correlated with the transmitted symbol sequence at the selected optimum time-delay. The complex-valued correlator output, $\hat{h}=Ae^{j\Phi}$, is then used as the estimate of the corresponding channel transfer function. Thus, the N-Tx by 1-Rx channel gains per each delay corresponding to the receiver phase shifts are sequentially measured and the maximum-energy delay (e.g., cluster) is selected for the best initial value.

Next, the vector of N complex-valued channel estimates is complex-conjugated and multiplied by matrix H. In one embodiment, angles of the complex-valued elements of this vector are then quantized into 2-4 bits, forming a vector of quantized phases. This vector is referred to herein as the MRC-based transmitter quantized phase shift (QPS) vector (i.e., the transmitter AWV) and is sent back to the transmitter via a reverse wireless channel such as the back channel described above, where it is used as the fixed transmit phase pattern for the next part of the first iteration. In one embodiment, the index of the transmitter AWV that produces the strongest signal at the receiver is also sent back to the transmitter via the reverse channel.

For the next part of the first iteration, the transmit phase pattern is set equal to the quantized phase vector calculated at the end of last iteration. That is, the transmitter phase shifts are set to the values calculated in the first part of the iteration that is for tuning of the transmitter AWV. The receive phase pattern, on the other hand, is set equal to the N columns of H one at a time where N corresponds to the number of antenna elements in an antenna array. Transmitting the same symbol sequence and using the same correlation procedure, SISO channel transfer functions are estimated for each receive phase pattern. In other words, the 1-Tx by N-Rx (1 transmit element by N receive elements) channel gains are sequentially measured at the receiver for maximum-energy delay and an estimate for the equivalent 1×M channel.

Similarly, the vector of N complex-valued channel estimates is complex-conjugated and multiplied by H. Angles of the complex-valued elements of this vector are then quantized into 2-4 bits, forming a vector of quantized phases. This vector is referred to as the MRC-based receiver quantized phase shift (QPS) vector (i.e., the receiver AWV). This AWV vector is used in the receiver as the fixed receive phase pattern for the next iteration. That is, the receiver phase shifts (weights) are set to these calculated values.

Thus, the same steps are repeated a number of times (e.g., 3, 4, etc.), where alternatively transmit or receive phase patterns are set equal to calculated quantized phase vectors from the previous iteration, while the patterns for the opposite operation, i.e., receive or transmit patterns, are set equal to N columns of H one at a time.

At the end of the iterations, the calculated transmit and receive phase vectors are used to form a beam in the optimum direction. The process can be repeated for each spatial transmit stream or beam. This allows for MIMO (Multiple Input, Multiple Output) and multiple beam searching and steering. Each beam can be determined independently of the others or coordinated in some way.

In one embodiment, the beam search (and beam tracking) signal is an OQPSK signal at $F_s/2$ sampling frequency, where $F_s$ is the OFDM sampling rate.

In one embodiment, up to three different initial receiver QPS vectors are used to improve performance of the optimum sampling-time estimation. Also, in one embodiment, the sequential channel estimation is performed by setting the transmitter (and receiver) weight vector to N columns of matrix H, one at time, and measuring N corresponding scalar channel estimates sequentially. Each channel estimation stage consists of N estimation intervals such that if V is the resulting 1×N (N×1) estimate vector, then the channel estimate is VH* (H*V)

The received signal should be neither saturated nor over-attenuated during each timing-recovery or iteration step, where transmit or receive phase patterns are swept through columns of H. Hence, an Automatic Gain Control (AGC) procedure is performed before each such step. In one embodiment, in this AGC procedure, an arbitrary symbol sequence covering the same bandwidth is transmitted over the air, while transmit and receive phase patterns are changed in the same fashion as the ensuing step. The received signal energy is measured, and the receiver gain is consequently set to a value such that the received signal is neither saturated nor over-attenuated for all transmit and receive phase patterns. If necessary, this procedure will be repeated a number of times (up to 3) until a suitable gain is found.

Extended HRP Beam Search with Spatial Multiplexing MIMO Training

Figure 8:
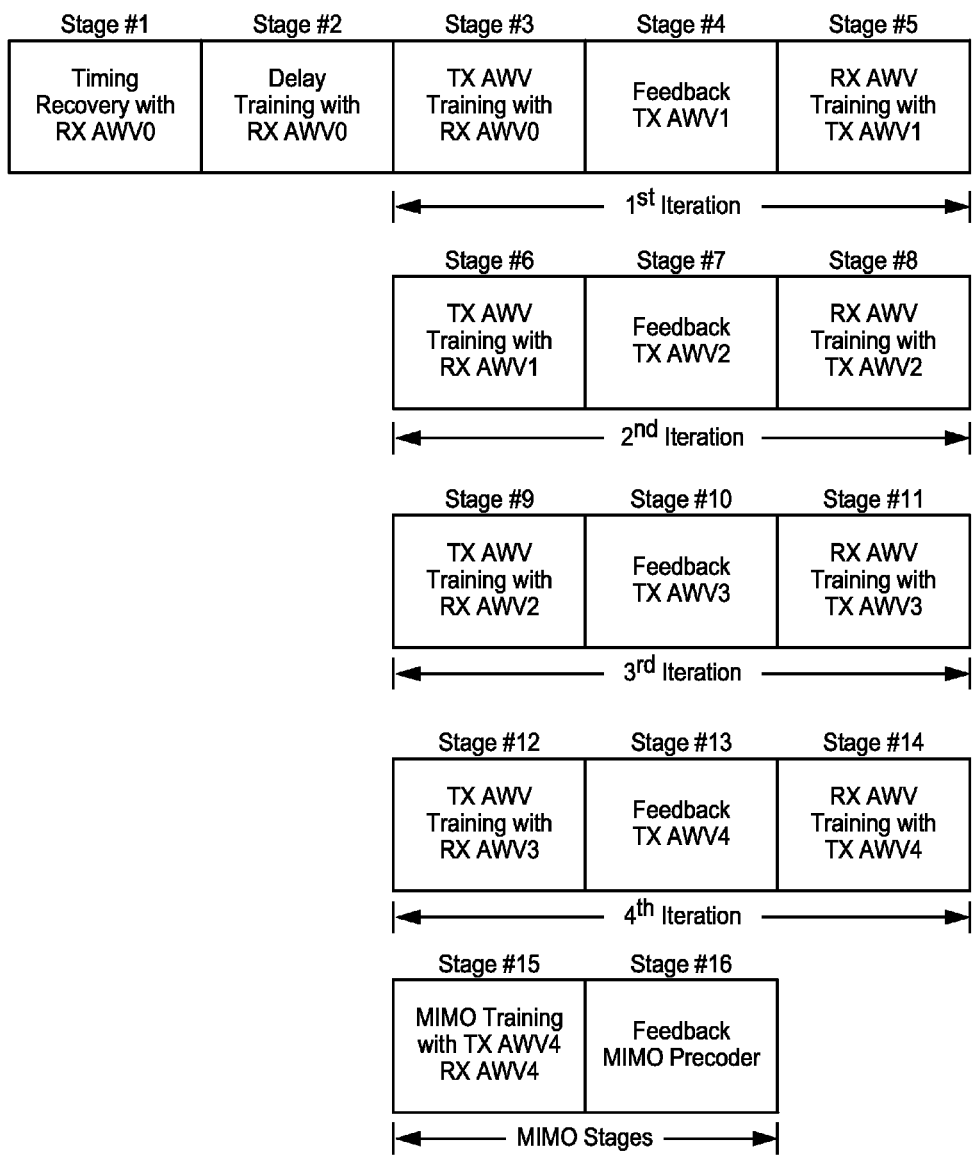
FIG. 8 is a block diagram of one embodiment of HRP Beam-Search stages including spatial multiplexing.
Figure 9:
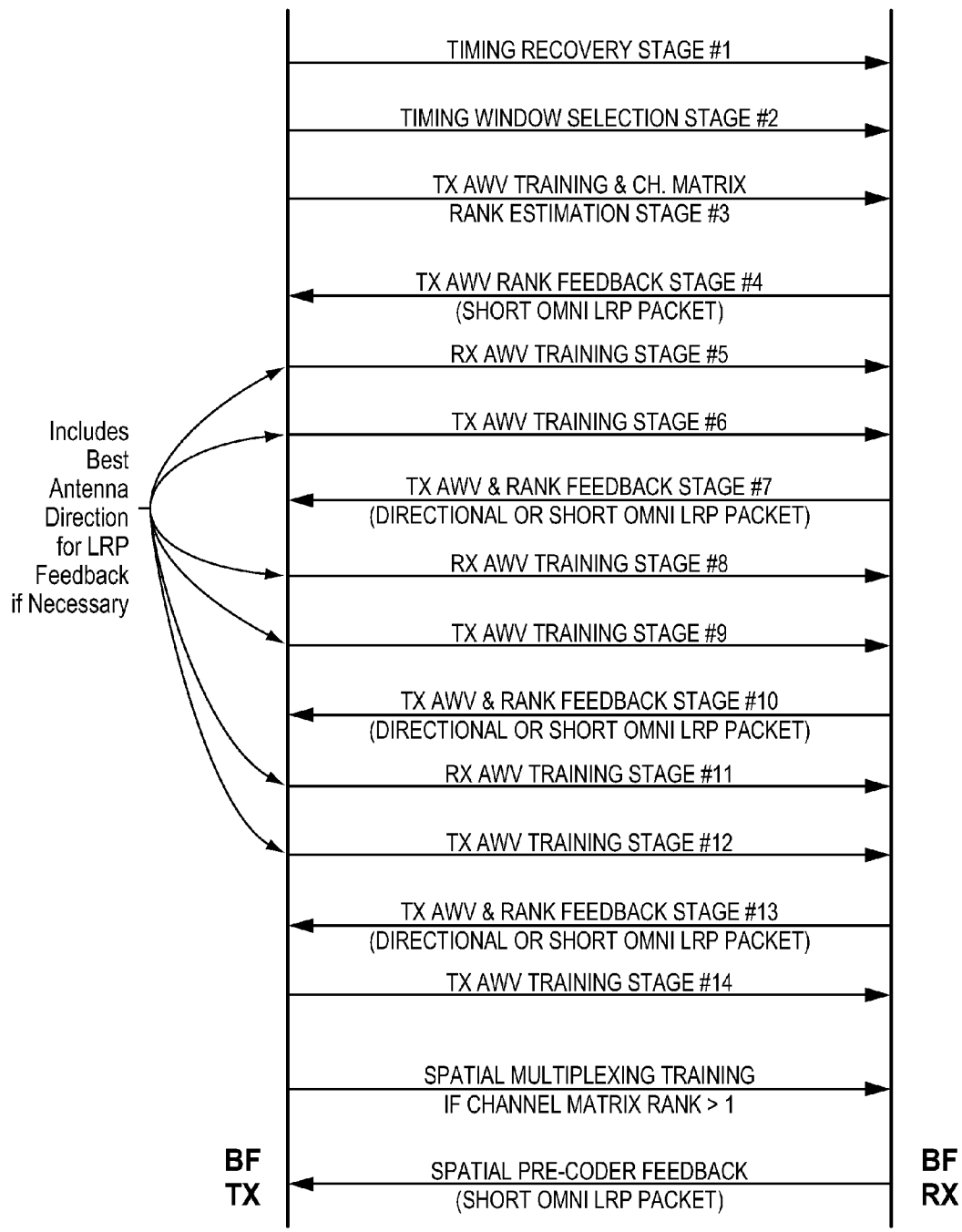
FIG. 9 is a ladder diagram of one embodiment of a sequence of HRP beam-search including spatial multiplexing training.

As mentioned above, FIG. 8 shows an Extended HRP Beam Search process that is particularly well suited to a SISO (Single Input, Single Output) context. For a MIMO (Multiple Input, Multiple Output) context, additional operations can be performed. The first portion of the beam search is a Timing Recovery (Stage #1), and a Delay Estimation (Stage #2). These are followed by four iterations of training and developing antenna weight vectors. These are shown as a sequence of Tx AWV Training (Stages #3, 6, 9, 12), Tx AWV Feedback (Stages #4, 7, 10, 13), and Rx AWV Training (Stages #5, 8, 11, 14) stages. These four iterations are also shown in FIG. 9.

The additional fourth training iteration provides more accurate antenna weight vectors. In a multiple stream context, inter-path interference is of greater concern and the fourth iteration further reduces this interference.

Additionally, after the AWV are established in stages 1 through 14, MIMO stages are traversed. FIG. 8 shows two MIMO stages, although more or fewer may be used. In particular MIMO training packets are sent out and received using the fourth iteration AWV at Stage #15. The receiver then provides pre-coder feedback for the MIMO context at Stage #16. This allows the spatial channels to be de-coupled in terms of the pre-coding matrix.

The feedback for the MIMO training stages can be provided in a variety of different ways. In one embodiment, the receiver calculates a transmit pre-coder matrix and provides it to the transmitter only for some of the sub-carriers. This reduces the computations and the overhead to support the channel. Values can also be averaged over several sub-carriers to reduce the number of parameters or coefficients that must be returned in feedback.

Automatic Gain Control

In one embodiment, the signal sent during AGC tuning intervals uses the same modulation but carries no information. The AGC gain can be maintained constant during each channel estimation stage. During each stage, either the transmit or receive weight vectors are changed (sweeping through N columns), which results in RSSI fluctuation. In this case, the AGC is run for all N possible weight vectors, the AGC level is fixed to the minimum obtained value, and then N channel estimations are performed.

Beam Steering for Multiple Beams

Figure 10:
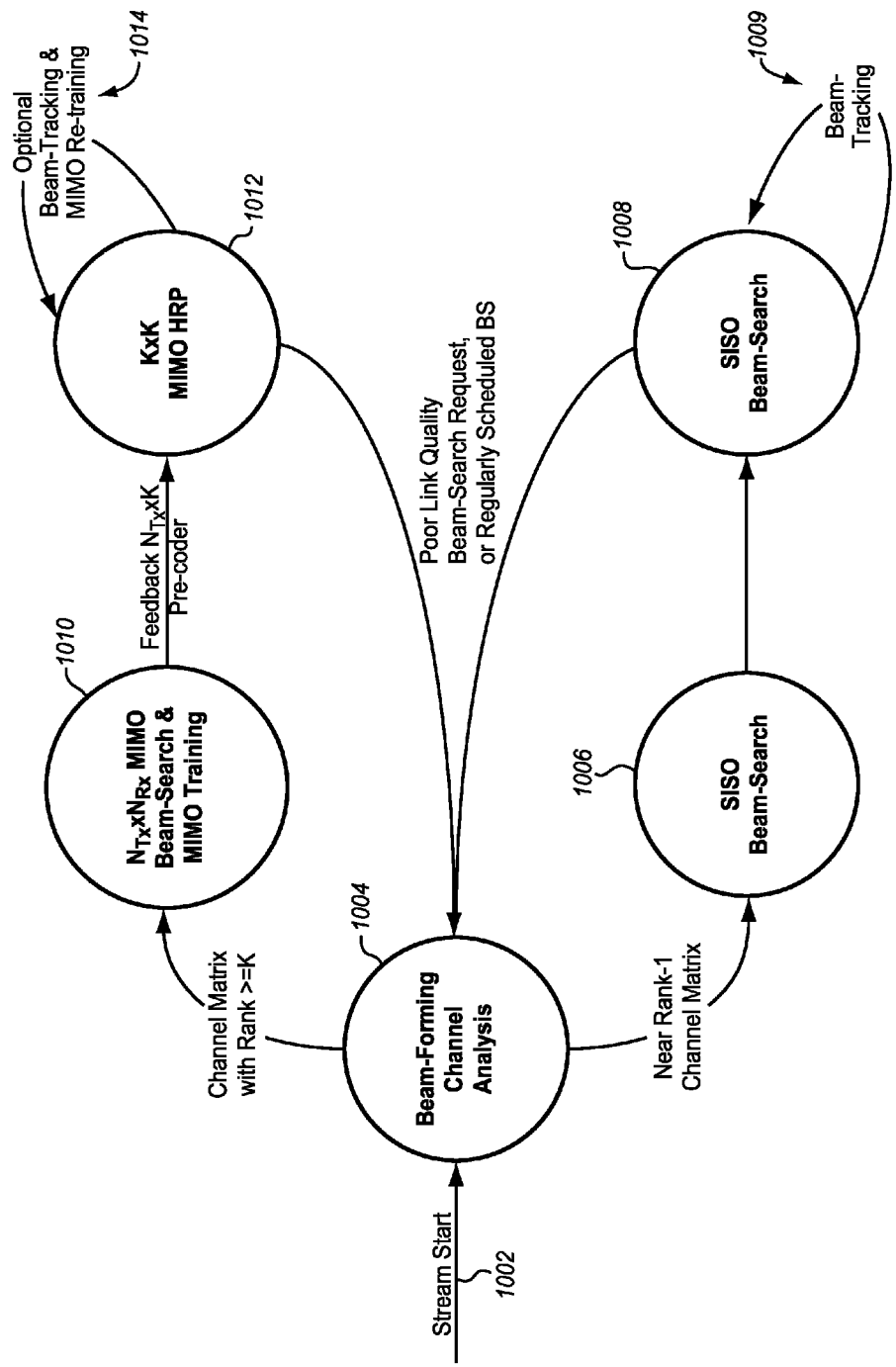
FIG. 10 is a diagram of an embodiment of a beam-steering state machine.

FIG. 10 illustrates an embodiment of a beam-steering state machine adapted for use with multiple antennas. After initialization, the state machine moves to a beam forming channel analysis state 1004 as a packet data stream 1002 is applied to the state machine. There are two paths possible. The first is identified as a SISO (Single Input, Single Output) path suitable for sending a single spatial channel at a time it includes a Beam-Search state 1006 and a HRP state 1008. The second is identified as a MIMO (Multiple Input, Multiple Output) path. It also has a Beam-Search state 1010 and an HRP state 1012. The MIMO path is used when multiple spatial channels are to be sent or received.

After initial acquisition, the state machine transitions to the beam forming channel analysis state 1004. Upon finding a channel and populating a beam forming channel matrix, the state machine enters either a single stream or multiple stream beam search state 1006, 1010 to perform the beam search. Beam search 1006, 1010 determines a set of beam forming vectors (TX AWV, RX AWV). For a multiple stream beam search, it also determines a number of spatial streams suitable for carrying the data. Training is also performed at this state for the multiple stream state. The training process determines a pre-coder matrix for a transmit process and a receive combiner matrix for a receive process.

In one embodiment, if there are a small number of spatial streams, the beam search and training state 1010 adaptively determines the N strongest propagation paths to use for the N spatial channels. These channels may or may not overlap. SVD (Singular Value Decomposition), or other many other methods can be used. For a large number of spatial streams a fixed beam-forming approach can be used. The fixed beam-forming approach starts with a specific number of fixed beams from which to select and then cycles through each of them. Those that provide the best results are selected for use.

In addition to a beam search, for a multiple stream state 1010, there can also be spatial multiplexing MIMO training. In spatial multiplexing MIMO training, training sequences are sent on each port to allow the channel coefficients to be estimated. There will be as many transmit ports as spatial channels and a training sequence can be sent on each one. The transmitter can receive feedback and then adjust its channel coefficients accordingly. Similarly, the receiver can compare the received training sequence to the expected training sequence and adjust its receive coefficients accordingly.

After estimating the channel coefficients, the estimates can be used to derive optimal pre-coder matrix coefficients. The pre-coder matrix coefficients can be sent from a receiver where they are derived to a transmitter where they are used. The receive matrix can then be further optimized by training on the pre-coder coefficients. These coefficients are applied to the pre-coder and receive matrices mentioned above.

Upon finding a beam or beams, the multiple channels presented by each antenna element can be converted into a selected number of fixed beams or spatial channels. The state machine enters a data transfer state 1008, 1012. From this state, the beam-forming state 1004 can be entered as soon as a source (e.g., a transmitter) or destination (e.g., a receiver) determines that a channel is considered bad (e.g., beam obstructed) (based on one or more metrics). The beam-forming channel analysis can also be scheduled regularly during data transfer state 1008, 1012.

In steady state 1008, 1012, data transfer operations are performed. In one embodiment, the number of data streams, the pre-coder matrix, and the receive combiner matrix all are maintained until the machine transitions to the beam-forming channel analysis state. The transmitter or receiver is in an HRP or LRP mode or both and data is communicated between the stations. The beam-forming vectors, however, can be adjusted. For both the single and multiple stream states, this includes beam tracking 1009, 1014 at predetermined intervals (e.g., every 1-2 msec). In one embodiment, the beam tracking is a shortened version of the beam search process. The beam search and beam tracking processes may be the same or similar to those described above.

In one embodiment, the beam search 1006, 1010 and the beam tracking 1009, 1014 can be triggered based on a schedule, feedback indicating that the link quality is poor, and by a request from a receiving or transmitting station. Beam tracking can be performed in a variety of different ways. In one embodiment, beam tracking has two iterations of a beam forming process in combination with a repeat of multiple stream training.

Figure 11:
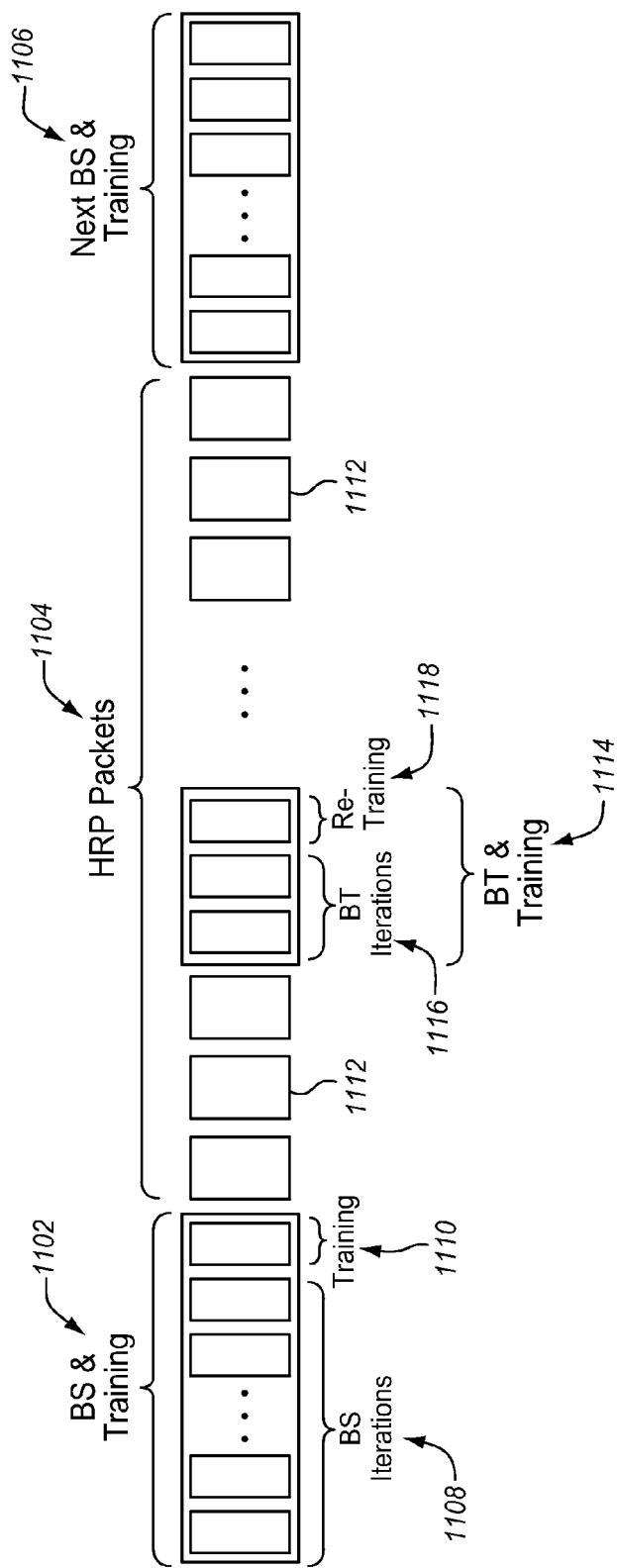
FIG. 11 is a diagram of a transmitted packet stream that includes beam steering and training packets.

FIG. 11 shows a sequence of packets that can be used in the data transmission state 1012. The sequence begins with beam search and training packets 1102. These can be used the beam search and training state 1010. Upon transitioning to the steady data transmit state 1012, a transmitter will send HRP packets 1104. This will continue until the next beam search and training state transition, which can occur on a schedule, request or reduction in quality. At this time, the next beam-search and training packets 1106 are sent.

The beam search packets include several iterations of beam search packets 1108 followed by a training packet 1110. The number and order of the packets can be modified for different applications. The next beam search and training packets 1106 will likely have the same structure. The HRP packets contain data traffic but, at intervals, a beam-tracking and training sequence 1114 can be included. This section includes iterations of beam-tracking packets 1116 followed by a training packet 1118.

In both cases, the packets are followed by a training packet. In the event that the pre-coder or weighting (AWV) coefficients are changed, the training packets allow a receiver to train onto the modified spatial channel. The number of iterations to be used for beam forming and beam tracking can be selected based on the particular implementation. In one example, the beam tracking uses two iterations of a beam forming cycle. FIG. 11 shows packets for a single spatial stream. In spatial multiplexing MIMO mode, the same packet sequences can be repeated for the other spatial streams. This allows beam tracking and beam searching to be performed simultaneously on each of the spatial streams. In one embodiment the beam tracking and training packets 1114 are offset for each stream to reduce inter-path interference effects.

Similarly, when the air interface uses sub-channels or sub-carriers as in OFDM, the training packets for different spatial streams can be sent on different sub-carriers or sub-channels. This can further reduce inter-path interference effects. So for example, if the frequencies of the carrier waves are in a sequence, then a first group of carrier waves, assigned to a first spatial stream and a second group of carrier waves, assigned to a second spatial stream, can contain frequencies that alternate in sequence. Alternatively, the first group and second groups of carrier waves can contain alternating groups of carrier waves in the sequence. As an example, if the first group can contain two adjacent carrier waves and the second group can contain two adjacent carrier waves adjacent to a carrier wave of the first group.

Figure 12A:
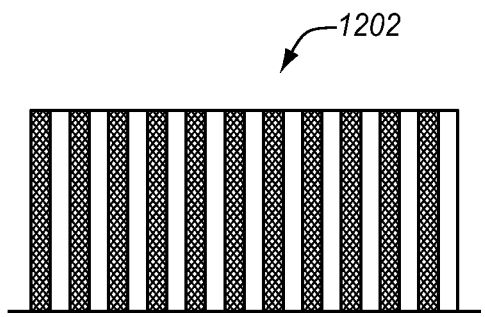
FIG. 12A is a diagram of consecutive sub-carriers.
Figure 12B:
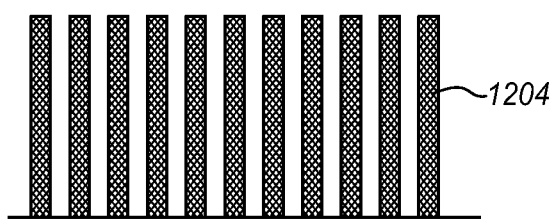
FIG. 12B is a diagram of alternating sub-carriers for assignment to a first stream.
Figure 12C:
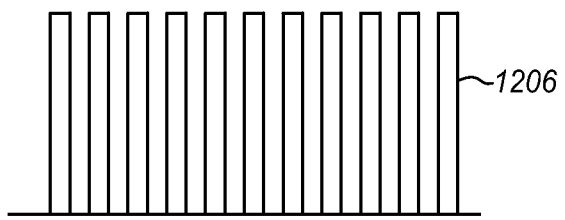
FIG. 12C is a diagram of alternating sub-carriers for assignment to a second stream.

FIG. 12A is a diagram of sub-carriers 1202 arranged from left to right in order of frequency with the lowest frequency on the left. Typically each of the sub-carriers are used by each spatial stream. In one embodiment, when there are two spatial streams and the packets are for beam search, beam tracking, or some other similar service, then the sub-carriers are divided between the two streams. FIG. 12B shows the sub-carriers 1204 that might be used for the first stream and FIG. 12C shows the sub-carriers 1206 that might be used for the second stream. If the streams were numbered from left to right, then the first stream uses the odd sub-carriers and the second stream uses the even sub-carriers.

The different sub-carriers groupings can also affect feedback in a beam-forming, beam training, or beam tracking process. In one embodiment, training packets or data packets are received on different frequencies or sub-carriers as shown in FIG. 12A. The feedback parameters are measured each for a single frequency and the parameters are combined to form values for groups of frequencies. The feedback can then provide the combined values and identify the frequency group corresponding to each combined value. The groups of frequencies can be adjacent frequencies as shown in FIG. 12A. Alternatively, the frequencies or sub-carriers can alternate in any desired pattern such as every third or fourth. The frequencies can also be in groups. so that one stream uses three or some other number of adjacent sub-carriers.

For generating feedback, it is not necessary to determine a quality parameter for every sub-carrier. The frequencies for which parameters are measured can be fewer than the frequencies upon which data packets are received. Frequencies evenly spaced among the transmitted frequencies can be selected. The spacing or interval can be pre-defined or developed by the system. In addition, the parameters measured for each data packet can be combined to reduce the total amount of information provided as feedback. A single parameter can be used to represent measurements for multiple packets. The parameters can be represented as feedback in any of a variety of different ways, such as by averages, ranges, deviations, etc.

Adaptive Beam Search (BS) Scheduling

A variety of different approaches have been mentioned for scheduling transitions between states of the state machine of FIG. 10 and for performing beam searching. Updating beam vectors helps to maintain the link quality. The scheduling of these updates can be made adaptive. This can be used to reduce the overhead of BS while providing fast responsiveness to the deterioration of a link. With adaptive BS scheduling, a BS can be scheduled in two or more different ways, regularly or driven by specific events.

Regular BS, which is scheduled periodically, aims to find a better beam when the current link is falling short of "a very good link". One embodiment of this classification would be when it was not working at the highest MCS (Modulation and Coding Scheme) level at which the system is supposed or capable of operating. In one embodiment, regular BS is not scheduled at the system's highest MCS level. This is because BS is not necessary when the link quality of the highest MCS level is good, and because BS failure events may cause additional link deterioration. To further reduce the negative effect of BS overhead on system performance, regular BS can be avoided close to relatively-long protocol signaling periods that result in buffering streams at the transmitter, such as beacon and contention periods.

With a reduced schedule as described above, events can be used to trigger BS in between scheduled times. These events can be related to link quality or application quality changes.

(1) Dynamic BS scheduling can be triggered when the system's lowest MCS level cannot maintain good quality for the current MCS rate. The triggering mechanism can be the receipt of too many negative acknowledgment, described in more detail with respect to rate adaptation. However, other triggers can alternatively be used, including channel quality feedback based on error rates, noise ratios, etc. The acknowledgment mechanism has a very short detection time and a low false alarm rate. The acknowledgments can be counted and compared to thresholds to determine a trigger in many different ways.

(2) An MCS rate-drop can also be used for BS scheduling. Video and audio streams often apply different compression or pre-processing techniques to scale media contents to fit the wireless link data rate. In general, the lower the data rate, the more noticeable artifacts are. Therefore, most systems try to keep the highest data rate as much as possible. Since rate drop is triggered by link quality degradation, the system may improve the link quality proactively by performing BS when the rate drops. This can shorten the times during which the system is operating at low MCS levels. BS can be scheduled before or after a rate drop, which depends on the relationship of media quality and link data rate.

(3) The probing state can also be used as a trigger for BS scheduling In one embodiment, the rate adaptation state machine enters a probing state. This occurs when the link is sufficiently good for the current MCS level, the buffer levels at the transmitter are low, and the receive buffers are relatively full. The system is therefore in a relatively stable condition. In this condition, the rate adaptation can enter a probing state to test whether the link can sustain a higher MCS rate. To support the beam search and training, data traffic is interrupted, but in the probe state, delaying traffic data at the transmitter is not likely to cause the receiver buffer to underflow or cause deterioration of the performance of the stream. BS during the probing state can then attempt to find improved beam vectors before the system probes a next higher MCS level. The additional overhead required by the BS process will typically not have a significant effect on the traffic data.

Transmission and Feedback

FIG. 13A is flow chart showing a process for transmitting and receiving signals. As shown at block 1302, a packet data stream is received for transmission. This is received at a source station such as transmitter 140, 500, or 600. The data can represent any of a variety of different kinds of information. There may be one or many different unrelated streams. As discussed above, the data stream can be video, audio, or data. The packet data is buffered for transmission to a sink station. In a typical WirelessHD user scenario the data stream is a television program or movie and the sink station is a television display, however, the invention is not so limited.

At block 1304 the source station performs a beam-forming or beam search operation by estimating antenna array weight vectors (AWV) for use in transmitting the stream of packets. Various approaches to this operation are described above. Several different transmit beams can be determined to support the transmission of different data streams to the same or different sink stations.

At block 1306, initial pre-coding coefficients are determined for the data packets for each transmit channel. The pre-coding coefficients are then applied to the data packets before transmission. In one embodiment, the source station maintains a matrix of pre-coding coefficients for each transmit channel.

At block 1308, each data packet is assigned to one of the transmission streams, channels or beams. The order of operations of FIG. 13A can be modified and some of the operations only need to be produced on initialization. In this example, the source station first establishes the parameters for each transmission stream and then assigns the packets to each stream as the packets are received. The packets can be assigned in order to keep like packets to the same stream or the packets may be assigned to different streams to provide diversity. In the example of transmitting a movie, there may a different movie for each stream or a single movie may be transmitted on several streams with some packets going to one stream and other packets going to other streams. As a result, the source station can provide a type of transmit diversity.

At block 1310, each data packet is independently transmitted through the antenna array to the remote sink station through its respective assigned transmission stream. The streams can be on different frequencies, they can use different estimated transmit weight vectors and different pre-coding coefficients. As mentioned above, each stream can be operated and controlled independently of each other stream and can be transmitted on the same or different antenna arrays, depending on the configuration of the source station and the operating environment.

At block 1312, the source station receives feedback from the remote sink station to which the packets are transmitted. The feedback is used to track the quality of the transmission channels during their use. As a result each stream can be trained simultaneously with its use for transmitting the data to the remote station.

At block 1314, the source station adjusts its estimated transmit weight vectors (AWV) based on the tracking. The AWVs are typically reflected in a set of phase shifters as phase shifter coefficients or in some other way depending on the nature of the phase shifters. Alternatively, the phases can be implemented at baseband. The source station then continues transmitting the packets through the antenna array using the adjusted estimated weight vectors.

At block 1316, the source station receives pre-coding feedback. This can also be while transmitting data over the transmission streams. This feedback can be in the form of a matrix, coefficients or other parameters. At block 1318, the source station adjusts its pre-coding coefficients based on the feedback and continues transmitting with the adjusted coefficients.

The source station continues to receive feedback as it transmits. This can be at defined time intervals or in response to a trigger. As it continues to receive feedback, it continues to adjust the transmission parameters. The beam tracking and training are repeated. If the channel fails, then the process can return to a new beam search at block 1304. In for example, FIGS. 8 and 9, there are many iterations of tracking and training before an initial AWV is determined. Similarly in the example of FIGS. 13A and 13B each operation can be repeated iteratively until a desired level of precision is achieved or until a specific number of iterations are finished.

Figure 13B:
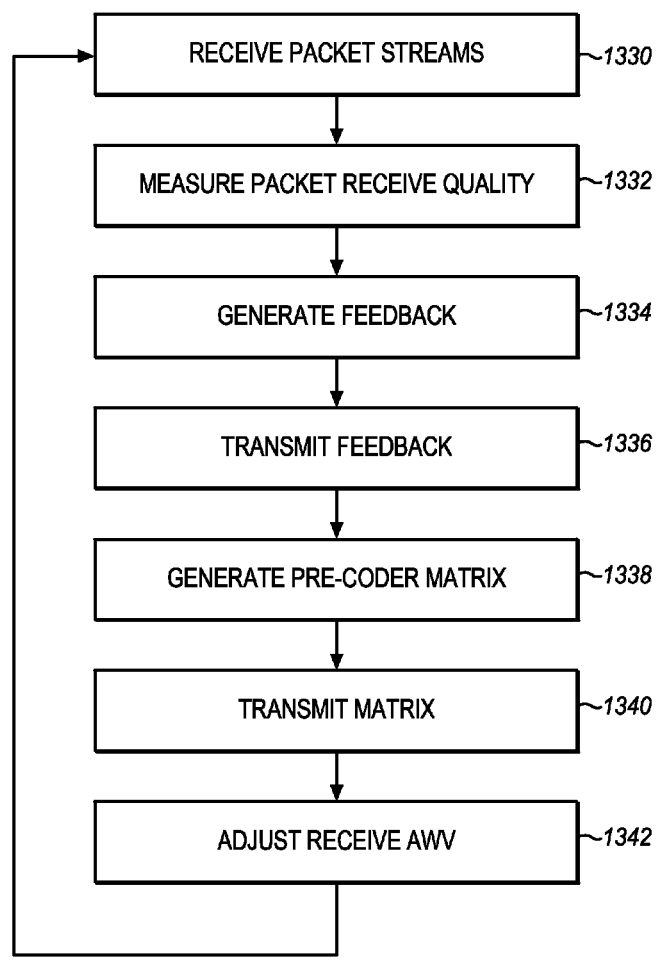
FIG. 13B is a process flow diagram of receiving at a sink station and providing feedback to the source station.
Figure 14:
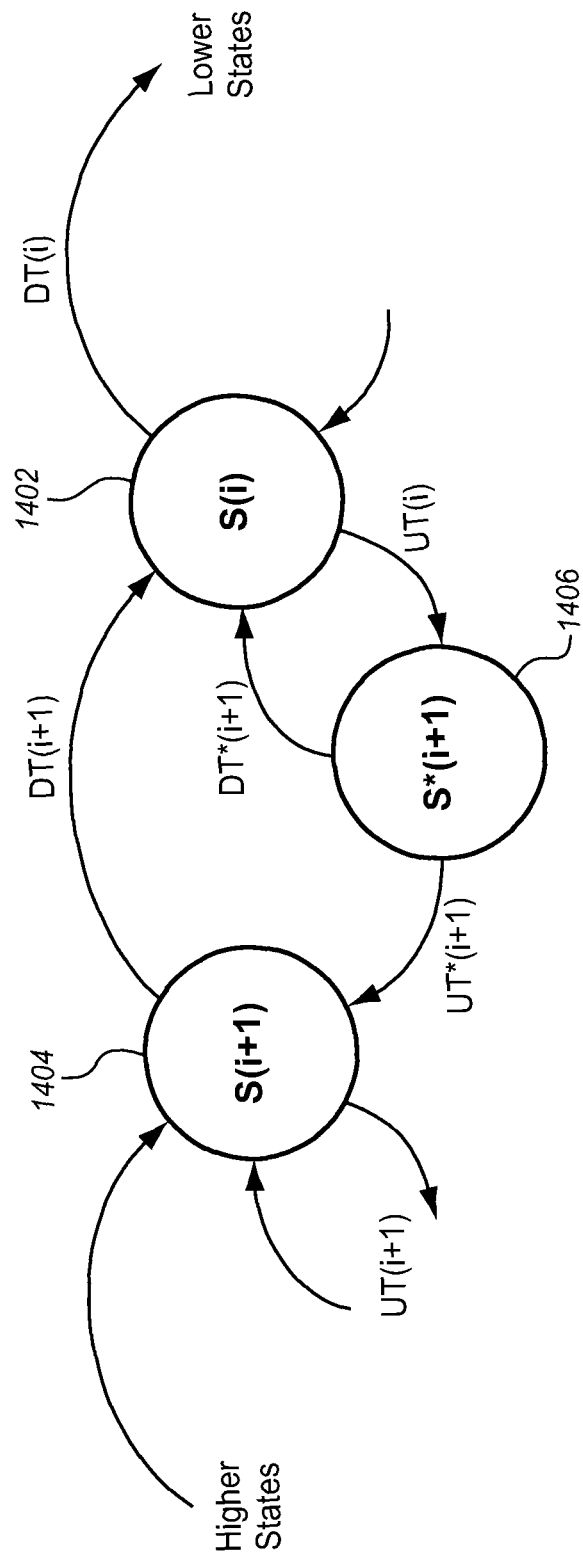
FIG. 14 is a state diagram of rate adaptation.

FIG. 13B refers to operations of the remote sink station that receives one or more packet streams at block 1330. The received packets are delivered to a player or storage interface as mentioned in the context of FIG. 1. At block 1332, parameter of the received streams is measured. The parameter can be any of the parameters mentioned above. The parameters can be measured for each frequency or for only some frequencies. Similarly, the parameters can be measured for each received packet or for only some packets. AT block 1334 feedback is generated based on the parameters and at block 1336, the feedback is sent back to the source station.

Similarly at block 1338, the sink station can generate pre-coder feedback, for example a pre-coder matrix, as described above and at block 1340 the pre-coder feedback is sent to the source station.

The sink station can also measure the received data streams and adjust its own receive antenna weight vector or vectors at block 1342. The source station can continue to receive packets, measure them, send feedback and train its receiver for as long as the source station continues to send.

In the above discussion, a LRP and HRP are discussed. While in a typical usage scenario, the data streams will be transmitted on an HRP and the feedback on a LRP, the invention is not so limited. If the packet data stream arrives at a sufficiently slow rate, then it may be transmitted on one or more LRP channels. Similarly if the sink station is also operating as a source station, and is transmitting using one or more HRP channels, then the feedback can be included on that channel.

As to the transmission by the source station at block 1310, there can be many transmission streams. The streams can be on different frequencies or with different AWVs, they can be on the same frequency. Each stream can have it own transmission parameters to form a different beam through a common antenna array or one or more streams can be transmitted through a different antenna array as in FIG. 5. Combination of different and shared antenna arrays can be used as in the context of FIG. 7. Each stream can also have an independent data and coding rate from each other stream.

In addition, the streams can be sent with independent of offset timing from each other stream. The streams can be cyclically offset from each other stream by a fixed amount. In the case of orthogonal frequency-division multiplexed streams, for example, this offset can be measured in terms of a fixed number of chips. This can be factored into scheduling to suit TDMA (Time Division Multiple Access) frame structures or TDM (Time Division Multiplexing) frame structures in either duplex or simplex modes.

Link Rate Adaptation

The transceiver architectures described above are able to transmit using several different modulation and coding system (MCSs) in order to accommodate different channel conditions. Rate adaptation allows one out of multiple MCSs to be chosen based on the current link conditions to maximize the link performance given a certain performance metric at that time. Different metrics can be used to assess link performance, such as packet error rate (PER) or bit error rate (BER) and signal-to-noise ratios (SNR). In PER- or BER-based approaches, long-term averaging can be adopted to calculate the average PER or BER of the current link, which can take time to collect error statistics with sufficient accuracy (e.g. small false alarm rate). A long error-accumulation time may result in the error statistics not correctly reflecting the link quality at the end of the measurement window. Channel conditions can change over a long measurement window. The rate adaptation is also too slow for some applications.

Alternatively, SNR can be used and mapped to PER by using pre-calculated PER or BER curves. However, the PER accuracy is limited by the accuracy of the SNR measurement and the accuracy of the PER or BER curves. Different multi-path channel delay-power profiles result in different PER or BER curves. Moreover, some SNR-based approaches require feedback of rate control information, thereby increasing signaling overhead.

For wireless video systems, the transmitter typically adapts the video data rate according to the link rate, which is controlled by the rate adaptation algorithm. If the link rate changes up and down very often, video quality fluctuates accordingly with the link rate, thereby causing video jittering.

A slow rate adaptation cycle will reduce this jittering. On the other hand, the quality of multimedia transmission over wireless links is vulnerable to wireless link errors that are associated with channel condition changes.

One approach to adapting the data rate is to use received acknowledgments. In many wireless systems the transmitter gets ACK/NACK (acknowledgment, negative acknowledgement) information for some or all of the data packets that it sends. Acknowledgments typically come from the traffic data sink but can also come from intermediate stations. In some cases, the receiver sends an ACK packet back after it receives the corresponding data packet. In other cases, it sends a block ACK packet that contains ACK/NACK information for the latest N packets after it receives those N packets. A link performance statistic based on binomial tests and probing states can be applied to ACK/NACK data to minimize the false alarm rate while assuring fast responsiveness.

Link performance statistics can be formed in one embodiment by grouping every M (M>=1) pieces of ACK/NACK information into an ACK group. When a new group is available, the algorithm counts how many NACKs are in it, say m (0<=m<=M), and updates M+1 counters, CNT(k), k=0, 1, ... M, representing the number of ACK groups that consecutively have k NACKs or more for k>0 and number of ACK groups with no NACKs for k=0, as follows.

For CNT(0), if m=0, CNT(0)=CNT(0)+1; if m>0, CNT(0)= 0.

For CNT(k), k>0, if m>=k, CNT(k)=CNT(k)+1; if m<k, CNT(k)=0.

The system changes the MCS level when the CNT(k) values satisfy the given thresholds. After a new MCS level is used, the CNT(k)'s need to be reset. These statistics are based on multiple binomial tests, which can well balance the competing concerns of false alarm avoidance and detection delay reduction.

In an operational configuration in which packets with sub-packets are transmitted, then there can be multiple group ACKs per packet. The ACKs can be sent independently for each packet or subpacket, so these ACKs can come in together as a group. They can come in on a single feedback channel.

FIG. 17 is a state machine diagram of one embodiment of a rate adaptation scheme. S(i) 1702 represents a stable transmission state with a specific MCS level, MCS(i). For purposes of this diagram, the i-th level represents a particular data rate and MCS(i+1)>MCS(i), meaning that MCS(i+1) provides a faster date rate. Therefore, the number of S(i)'s is equal to the number of MCS levels, in this case n, although only two are shown. Additional states occur to the left and right of the illustrated states. DT(i) represents down-rate thresholds from state S(i), and UT(i) represents the up-rate thresholds from state S(i).

From S(i), for example, if the count is below the down rate threshold DT(i), then the machine moves to a lower state (not shown). If the count is above the up rate threshold UT(i), then the state machine moves through a probing state to a higher state (S(i+1).

In addition to the n stable states (S(i)), the rate adaptation state machine includes n−1 probing states named S*. S*(i+1) tries the next higher rate that is used in S(i+1). With frame aggregation, some packets in a block of multiple packets can be sent with the current MCS rate in S(i) and others with the next higher rate in S(i+1) that is to be probed. The probing states allow the higher state to be tested without affecting the data transmission rate and without significant errors. The rate increase, therefore, has two phases. The first phase is a transition to the probing state. If the up threshold UT*(i+1) is satisfied, then the system enters the next higher state S(i+1). If not, then the system returns to the previous stable state S(i). To increase stability, the down-rate condition from a probing state DT*(i+1) can be set lower than that from the next higher rate state DT(i+1).

For reducing the data rate, each CNT(k) has its threshold, THR(k). In one embodiment, if any of CNT(k)>=THR(k), k=1, 2, ... M, then the MCS rate is lowered at the next sending period. Those thresholds are determined by the desired link PER threshold that optimizes the system performance. According to probability theory, the smaller the link PER thresholds, the smaller the CNT(k)s. In addition the system can be configured so that, THR(i)<THR(j), for i>j. First, a longer detection time for a smaller PER guarantees detection accuracy. A larger threshold results in a longer detection time. Second, the link capacity suffers more from a high PER. Dropping the rate quickly makes the link more robust.

Certain conditions can be applied to permit the MCS rate to be dropped from a probing state, DT*(i+1) to a lower stable state. In one embodiment, the conditions are that CNT(k)>=THR*(k), k=1, 2, ... M. Compared to the DT(i) conditions, THR*(k) thresholds are less than or equal to THR (k) thresholds, which can shorten the time to detect that the rate is too high in the probing states, thereby saving bandwidth resources in higher-rate probing.

Certain conditions can be applied to allow a rate increase to a probing state, UT(i). In one embodiment, the conditions are CNT(0)>THR(0), and STAY_TIME>TRY_INTERVAL, in which THR(0) is the threshold for going up to S*(i+1), and STAY_TIME is the duration in which the system has stayed in a stable state. THR(0) and TRY_INTERVAL are reset to be their initial values when the rate drops from a stable state. If the rate drops from a probing state, they are increased until they reach the maximum values to raise the up-rate thresholds and also make intervals between two trials in a probing state longer, thereby balancing the delay of rate increase and the wasting of resources on unsuccessful probing processes.

For increase the rate to a new stable state, UT*(i+1), if CNT(0)>THR*(0), the system will go to the next stable state S(i+1), in which THR*(0) is the threshold for transferring to S*(i+1). Note that any thresholds in the above conditions may be different in different states.

In one embodiment, the operations for rate adaptation begin with receiving a stream of data packets at a transmitter for transmission to a remote station. These packets are transmitted at some initial MCS rate to a remote station through a transmission stream. The transmitting station then receives acknowledgments ACK or NACK for some or all of the packets from the remote station.

A record is then stored of the received acknowledgments in groups, each group of records corresponds to some defined number of packets. The number of received acknowledgments for each group is counted and from this, a channel link quality measure is determined. The packets of each group can be consecutive. Using this the transmission parameters, such as the MCS rate can be adjusted. In the example of FIG. 17, the counts are compared to thresholds. For each state, there is threshold for moving up and a threshold for moving down. Timers can also be used to reduce the frequency of rate changes.

A more accurate view of link conditions can be obtained by comparing the counted number for each group to a threshold, determining the number of groups that exceed the threshold and then comparing the number of groups that exceed the threshold to a group threshold.

When MIMO and spatial multiplexing technologies are applied, different spatial streams can experience different and unrelated channel conditions. In theory, independently controlling the data rate for each spatial stream can achieve a higher channel capacity. To enable per-stream MIMO rate adaptation, some channel quality indicator of each spatial stream can be fed back to the transmitter. However, feeding back a specific channel quality indicator requires additional bandwidth overhead, reducing the bandwidth available for data.

If each packet has a CRC (Cyclic Redundancy Check) code or some other error detection or correction code, the ACK/NACK information for each packet or for packets on each stream can be used not only to correct the packet content but also to determine the quality of the spatial stream through which the packet was transmitted. If the ACK/NACK information is already transmitted for data confirmation, then there is no additional signaling overhead for the channel quality feedback. This feedback, for example, can be used also for per-stream MIMO rate adaptation.

In one embodiment of a per-stream MIMO rate adaptation, each spatial stream has its own state machine for rate transferring, and the corresponding data ACK/NACK information is fed into the state machine as an input. Each rate adaptation element has the same triggering mechanisms and controls the rate for the corresponding spatial stream in the same way as a SISO rate adaptation algorithm does. In this way, per-stream MIMO rate adaptation can separately adjust rates for spatial streams that physically experience different channel qualities to achieve a higher total transmission throughput for the multiple streams.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A transmitter comprising:
a signal processor to receive a plurality of data streams;
a plurality of analog converters each coupled to the signal processor to receive the plurality of data streams from the signal processor and to modulate the data streams onto carrier waves;
a plurality of phase shifters each coupled to an analog converter to each receive a modulated stream;
a first antenna coupled to more than one of the plurality of phase shifters to receive the modulated data stream from each phase shifter and transmit it on its respective carrier wave; and
a second antenna to receive at least one modulated data stream and transmit it on its respective carrier wave.

2. The transmitter of claim 1, wherein the plurality of analog converters are each coupled to receive a single data stream from the signal processor.

3. The transmitter of claim 1, wherein the signal processor routes each data stream to each of the plurality of analog converters using at least two alternative modes, the first mode routing each data stream to a different analog converter, and the second mode routing combinations of data streams to each analog converter.

4. The transmitter of claim 1, wherein the analog converters are coupled to each receive a single data stream.

5. The transmitter of claim 1, wherein the second antenna is coupled to a plurality of phase shifters to receive a modulated data stream from each phase shifter.

6. The transmitter of claim 1, further comprising:
- a second plurality of analog converters each coupled to the signal processor to receive a second plurality of data streams from the signal processor and to modulate the data streams onto carrier waves;
- a second plurality of phase shifters each coupled to an analog converter to each receive a modulated stream; and
- a plurality of antennas each coupled to more than one of the second plurality of phase shifters to receive the modulated data stream from each phase shifter and transmit it on its respective carrier wave.

7. The transmitter of claim 1, wherein the first and second antennas are comprised by a plurality of antennas each coupled to more than one phase shifter to receive the modulated data stream from each phase shifter and transmit it on its respective carrier wave.

8. A transmitter comprising:
- a signal processor to receive a plurality of data streams and to assign the data streams each to one of a plurality of transmission streams;
- an analog converter coupled to the signal processor to receive a first data stream and a second data stream;
- a phase shifter coupled to the analog converter to shift the phase of the first and second data streams;
- a first phased antenna array having a first polarization orientation coupled to the phase shifter to receive the first data stream and transmit the first data stream on a beam formed transmission stream modulated on a first carrier wave with a first polarization orientation; and
- a second phased antenna array having a second polarization orientation coupled to the phase shifter to receive the second data stream and transmit the second data stream on a beam formed transmission stream modulated on a second carrier wave with a second polarization orientation.

9. The transmitter of claim 8, wherein the phased antenna arrays form spatially independent beams directed to a single remote station.

10. The transmitter of claim 8, wherein the respective carrier waves of the first and second data streams are the same carrier wave.

11. The transmitter of claim 8, wherein first and second polarization orientations are orthogonal.

12. A receiver comprising:
- a plurality of antennas each to receive a plurality of transmitted spatial data streams;
- a plurality of phase shifters each coupled to a first antenna of the plurality of antennas to shift the phase of the received spatial data streams;
- a plurality of digital converters each coupled to a portion of the plurality of phase shifters to each receive the plurality of received data streams and to each convert the received data streams into a respective baseband data packet stream; and
- a signal processor coupled to the digital converters to receive the respective baseband data streams and to control the plurality of phase shifters.

13. The receiver of claim 12, wherein the plurality of digital converters are each coupled to receive a single spatial stream from the respective phase shifters.

14. The receiver of claim 12, wherein the signal processor configures the phase shifters in groups to receive a respective spatial stream.

15. The receiver of claim 12, wherein each antenna of the plurality of antennas is coupled to more than one phase shifter and wherein the phase shifters are each coupled to a digital converter such that each antenna is coupled to a phase shifter to each digital converter.

16. The receiver of claim 12, further comprising:
- a second plurality of antennas each to receive a plurality of transmitted spatial data streams;
- a second plurality of phase shifters coupled to the second plurality of antennas to shift the phase of the received spatial data streams; and
- a second plurality of digital converters each coupled to a portion of the plurality of phase shifters to provide a respective baseband data packet stream to the signal processor.

17. A receiver comprising:
- a first phased antenna array having a first polarization orientation to receive a first polarized spatial data stream modulated on a first carrier wave with a first polarization orientation;
- a second phased antenna array having a second polarization orientation to receive a second polarized spatial data stream modulated on a second carrier wave with a second polarization;
- a plurality of phase shifters to shift the phase of the first and second data streams;
- a plurality of digital converters each coupled to a portion of the plurality of phase shifters to receive the first and second data streams; and
- the signal processor coupled to the digital converters to receive the first and second data streams.

18. The receiver of claim 17, wherein the phased antenna arrays receive spatially independent beams from a single remote station.

19. The receiver of claim 17, wherein the respective carrier waves of the first and second spatial data are the same carrier wave.

20. The receiver of claim 17, wherein first and second polarization orientations are orthogonal.

* * * * *